United States Patent
Tomikawa

(10) Patent No.: US 10,762,861 B2
(45) Date of Patent: Sep. 1, 2020

(54) LIQUID CRYSTAL DEVICE, METHOD FOR DRIVING LIQUID CRYSTAL DEVICE, AND ELECTRONIC APPARATUS

(71) Applicant: SEIKO EPSON CORPORATION, Tokyo (JP)

(72) Inventor: Naoki Tomikawa, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/517,773

(22) Filed: Jul. 22, 2019

(65) Prior Publication Data

US 2020/0027413 A1  Jan. 23, 2020

(30) Foreign Application Priority Data

Jul. 23, 2018  (JP) .................................. 2018-137483

(51) Int. Cl.
| | | |
|---|---|---|
| *G09G 3/36* | (2006.01) | |
| *G02F 1/1335* | (2006.01) | |
| *G02F 1/1343* | (2006.01) | |
| *G02F 1/1368* | (2006.01) | |
| *G02F 1/1333* | (2006.01) | |

(52) U.S. Cl.
CPC ..... *G09G 3/3614* (2013.01); *G02F 1/133512* (2013.01); *G02F 1/134336* (2013.01); *G02F 1/1368* (2013.01); *G02F 2001/133397* (2013.01); *G02F 2201/121* (2013.01); *G02F 2201/123* (2013.01); *G09G 2300/0478* (2013.01)

(58) Field of Classification Search
CPC ......... G02F 1/133512; G02F 1/134336; G02F 1/1368; G02F 2001/133397; G02F 2201/121; G02F 2201/123; G09G 2300/0426; G09G 2300/0478; G09G 2320/0257; G09G 2320/046; G09G 3/001; G09G 3/3614; G09G 3/3648
See application file for complete search history.

(56) References Cited

U.S. PATENT DOCUMENTS 9,202,420 B2 * 12/2015 Murayama ............. G09G 3/344
9,858,875 B2 *  1/2018 Tomikawa ........... G09G 3/3614
10,453,890 B2 * 10/2019 Kaneda ............. H01L 27/14665
(Continued)

FOREIGN PATENT DOCUMENTS

| JP | 2015-001634 A | 1/2015 |
|---|---|---|
| JP | 2015-111247 A | 6/2015 |

(Continued)

*Primary Examiner* — Tony O Davis
(74) *Attorney, Agent, or Firm* — Oliff PLC

(57) ABSTRACT

In a liquid crystal device, a plurality of pixel electrodes are provided in a pixel region E, in a first substrate. The first substrate is provided with a first electrode interposed between the pixel region and a sealing material in a plan view, and a second electrode interposed between the first electrode and the sealing material in a plan view. Of the plurality of pixel electrodes, a first signal of a first phase is supplied to a first pixel electrode that is adjacent to the first electrode, a second signal of a second phase having a phase delay with respect to the first signal is applied to the first electrode, and a third signal of a third phase having a phase delay with respect to the second signal is applied to a second electrode.

13 Claims, 19 Drawing Sheets

(56) References Cited

U.S. PATENT DOCUMENTS

| | | |
|---|---|---|
| 2014/0368481 A1 | 12/2014 | Tomikawa |
| 2016/0209685 A1 | 7/2016 | Tomikawa et al. |
| 2016/0253973 A1 | 9/2016 | Nishida et al. |
| 2016/0284302 A1* | 9/2016 | Tomikawa ............ G09G 3/3614 |
| 2019/0058106 A1* | 2/2019 | Meng ........................ G01L 1/16 |
| 2020/0026131 A1* | 1/2020 | Tomikawa ............. G02F 1/1337 |
| 2020/0027413 A1* | 1/2020 | Tomikawa ........ G02F 1/133512 |

FOREIGN PATENT DOCUMENTS

| | | | |
|---|---|---|---|
| JP | 2016-133634 A | 7/2016 | |
| JP | 2016-161621 A | 9/2016 | |

\* cited by examiner

LIQUID CRYSTAL DEVICE, METHOD FOR DRIVING LIQUID CRYSTAL DEVICE, AND ELECTRONIC APPARATUS The present application is based on and claims priority from JP Application Serial Number 2018-137483, filed Jul. 23, 2018, the disclosure of which is hereby incorporated by reference herein in its entirety.

BACKGROUND

1. Technical Field

The present disclosure relates to a liquid crystal device, a method for driving the liquid crystal device, and an electronic apparatus.

2. Related Art

A liquid crystal device includes a liquid crystal panel in which a liquid crystal layer is held between a pair of substrates, and when light is incident on the liquid crystal panel, a liquid crystal material or the like used in the liquid crystal layer may undergo a photochemical reaction, and ionic impurities may be generated. Further, in a manufacturing process of the liquid crystal device, ionic impurities may also enter the liquid crystal layer from a sealing material or the like. Meanwhile, when the liquid crystal device is driven, causing an alignment state of liquid crystal molecules to change and flow to occur in the liquid crystal layer, the ionic impurities aggregate at end portions of a pixel region, and display quality deterioration arises as a result of image sticking or the like. Thus, in JP 2015-111247 A, a technology is proposed in which an AC voltage is applied to a plurality of pixel electrodes in a pixel region, and ionic impurities are swept to end portions of the pixel region overlapping with a demarcation portion. In addition, in JP 2015-111247 A and JP 2015-1634 A, a technology is proposed in which a first electrode is provided between a pixel region and a sealing material, a second electrode is provided between the first electrode and the sealing material, and an electric field generated between the first electrode and the second electrode is used to sweep out ionic impurities to the outside of the pixel region.

In the technology described in JP 2015-111247 A, when simply applying the AC voltage to the pixel electrodes in the pixel region, the ionic impurities are only swept to the end portions of the pixel region, and when the ion impurities accumulated at the end portions are diffused into a display region, there is a problem that display quality is affected. Further, with the method for sweeping out the ionic impurities to the outside of the pixel region by using the electric field generated between the first electrode provided outside the pixel region and the second electrode, as in the technology described in JP 2015-111247 A and JP 2015-1634 A, the ion impurities are not efficiently swept at a boundary between the inside and the outside of the pixel region, and there is a problem that the ionic impurities easily accumulate in the end portions of the pixel region.

SUMMARY

In light of the problems described above, an object of the present disclosure is to provide a liquid crystal device, a method for driving a liquid crystal device, and an electronic apparatus capable of efficiently sweeping out ionic impurities from a pixel region to the outside.

In order to solve the problems described above, a liquid crystal device according to the present disclosure includes a first substrate, a second substrate adhered to the first substrate via a sealing material, a liquid crystal layer disposed in a space enclosed by the sealing material between the first substrate and the second substrate, a plurality of pixel electrodes provided at a pixel region of the first substrate. A first electrode is provided at one of the substrates, of the first substrate and the second substrate, and positioned between the pixel region and the sealing material in a plan view, and a second electrode is provided at the one of the substrates and positioned between the first electrode and the sealing material in a plan view. A first signal of a first phase is supplied to a first pixel electrode, of the plurality of pixel electrodes, adjacent to the first electrode, a second signal of a second phase having a phase delay with respect to the first signal is supplied to the first electrode, and a third signal of a third phase having a phase delay with respect to the second signal is supplied to the second electrode.

Further, according to another aspect of the present disclosure, in a driving method of a liquid crystal device including a first substrate, a second substrate adhered to the first substrate via a sealing material, a liquid crystal layer disposed in a space enclosed by the sealing material between the first substrate and the second substrate, and a plurality of pixel electrodes provided at a pixel region of the first substrate, a first electrode is provided at one of the substrates, of the first substrate and the second substrate, and positioned between the pixel region and the sealing material in a plan view, and a second electrode is provided between the first electrode and the sealing material in a plan view, the method including supplying a first signal of a first phase to a first pixel electrode, of the plurality of pixel electrodes, adjacent to the first electrode, supplying a second signal of a second phase having a phase delay with respect to the first signal to the first electrode, and supplying a third signal of a third phase having a phase delay with respect to the second signal to the second electrode.

In the present disclosure, the first electrode is provided between the pixel region and the sealing material, and the second electrode is provided between the first electrode and the sealing material. The first signal of the first phase is supplied to the first pixel electrode, of the plurality of pixel electrodes at the pixel region, adjacent to the first electrode, the second signal of the second phase having a phase delay with respect to the first signal is applied to the first electrode, and the third signal of the third phase having a phase delay with respect to the second signal is applied to the second electrode. Thus, ionic impurities in the pixel region are swept toward the first electrode by an electric field between the pixel electrode and the first electrode, and then swept toward the second electrode by an electric field between the first electrode and the second electrode.

DESCRIPTION OF EXEMPLARY EMBODIMENTS

Figure 1:
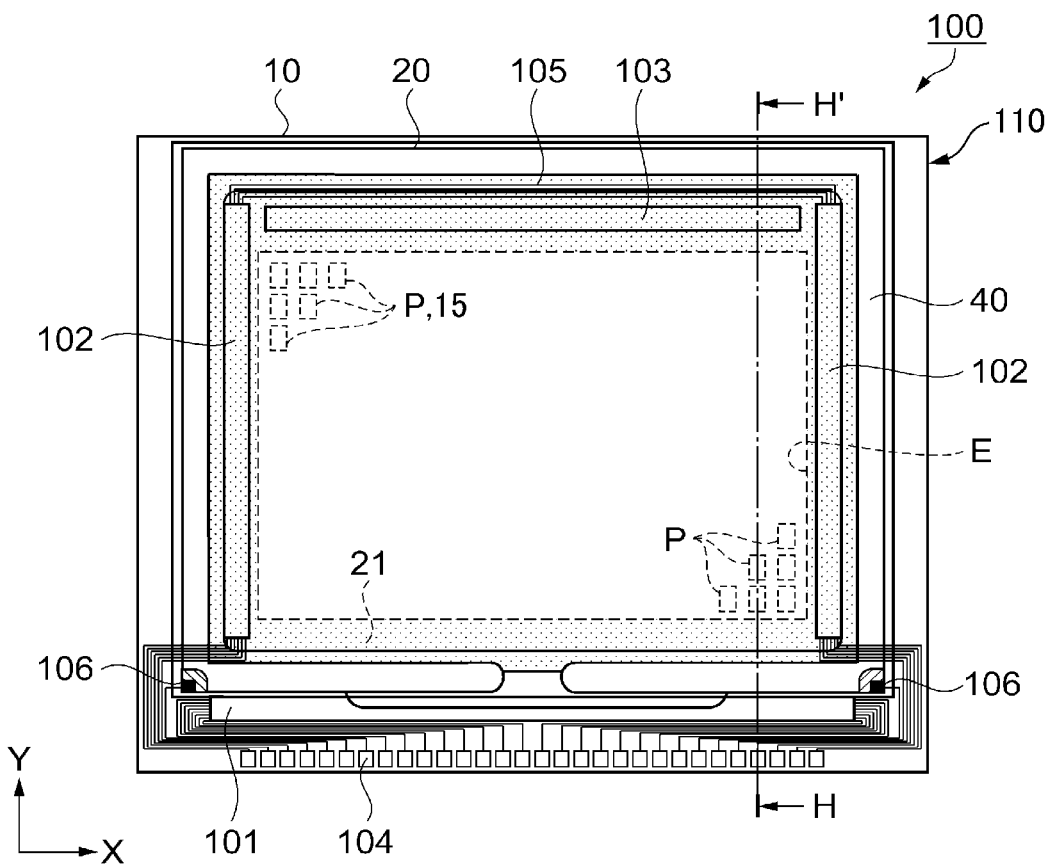
FIG. 1 is an explanatory diagram schematically illustrating a plan view configuration of a liquid crystal device according to Exemplary Embodiment 1 of the present disclosure.

Exemplary embodiments of the present disclosure will be described below with reference to the accompanying drawings. Note that in the drawings referred to below, parts described are illustrated in an enlarged or reduced state as appropriate, so that those parts can be easily recognized. Further, in the description below, when describing films or the like formed on a one surface 10s of a first substrate 10, an upper layer refers to a side opposite to the first substrate 10, and a lower layer refers to a side of the first substrate 10. When describing films or the like formed on a one surface 20s of the second 20, an upper layer refers to a side opposite to the second substrate 20, and a lower layer refers to a side of the second substrate 20. Further, a plan view means a state as viewed from a normal direction with respect to the first substrate 10 and the second substrate 20. Furthermore, in the description below, as an example of a transistor, an active matrix type liquid crystal device 100, which is provided with a thin film transistor (a TFT) 30 as a pixel switching element, will be mainly described. Such a liquid crystal device 100 can be suitably used as a light modulation unit of a projection-type display device, which will be described below, or the like.

Exemplary Embodiment 1

Figure 2:
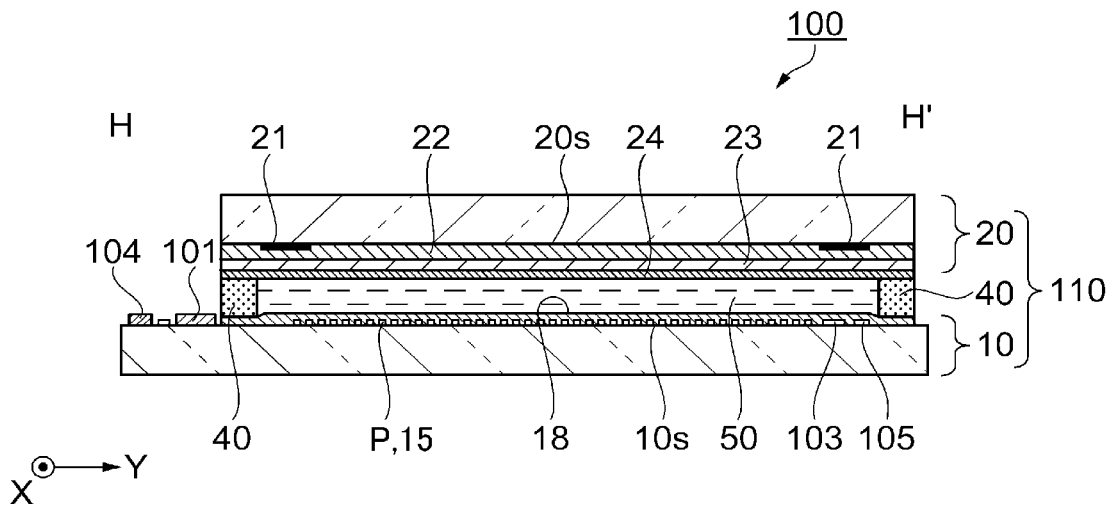
FIG. 2 is a cross-sectional view schematically illustrating a state in which the liquid crystal device illustrated in FIG. 1 is cut along a line H-H'.

FIG. 1 is an explanatory diagram schematically illustrating a plan view configuration of the liquid crystal device 100 according to Exemplary Embodiment 1 of the present disclosure. FIG. 2 is a cross-sectional view illustrating a state in which the liquid crystal device 100 illustrated in FIG. 1 is cut along a line H-H'. The liquid crystal device 100 illustrated in FIG. 1 and FIG. 2 includes the first substrate 10 and the second substrate 20 facing the first substrate 10, and the first substrate 10 and the second substrate 20 are adhered together being intervene by a frame-shaped sealing material 40. Further, of a space between the first substrate 10 and the second substrate 20, a liquid crystal layer 50 is held in a space surrounded by the sealing material 40. The first substrate 10 and the second substrate 20 are formed by a light-transmissive substrate, such as a quartz substrate or a glass substrate, for example.

The first substrate 10 is larger than the second substrate 20, and the sealing material 40 is disposed along an outer edge of the second substrate 20. The liquid crystal layer 50 is formed by a liquid crystal material having positive or negative dielectric anisotropy. The sealing material 40 is formed from an adhesive such as a thermosetting or ultraviolet-curable epoxy resin, and includes a spacer (not illustrated) for maintaining a constant spacing between the first substrate 10 and the second substrate 20.

In a region surrounded by the sealing material 40, a pixel region E is provided in which a plurality of pixels P are arranged in a matrix shape, and the second substrate 20 is provided with a demarcation portion 21 surrounding the pixel region E at least between the sealing material 40 and the pixel region E. The demarcation portion 21 is configured by a light shielding layer made from metal, metal oxide, or the like. Although not illustrated, the light-shielding layer may be configured as a black matrix that overlaps with boundary portions of the adjacent pixels P in a plan view, with respect to the second substrate 20.

On the one surface 10s of the first substrate 10, which faces the second substrate 20, a plurality of terminals 104 are arranged along one side between the sealing material 40 and the pixel region E, and a data line driving circuit 101 is provided between the terminals 104 and the pixel region E. On the one surface 10s of the first substrate 10, a scanning line driving circuit 102 is provided between the sealing material 40 and the pixel region E along each of two sides adjacent to the side on which the terminals 104 are arranged, and an inspection circuit 103 is provided along a side opposite to the side on which the terminals 104 are arranged. On the one surface 10s of the first substrate 10, between the sealing material 40 and the inspection circuit 103, a plurality of wiring lines 105 that couple the two scanning line driving circuits 102 are provided. The data line driving circuit 101 and each of a plurality of wiring lines coupled to the scanning line driving circuits 102 are coupled to the plurality of terminals 104. Hereinafter, a direction in which the terminals 104 are arranged is referred to as an X direction (a first direction), and a direction orthogonal to the X direction is referred to as a Y direction (a second direction). Thus, the dimension of the pixel region E in the X direction is greater than the dimension of the pixel region E in the Y direction. Note that the inspection circuit 103 may be provided between the data line driving circuit 101 and the pixel region E.

A pixel electrode 15 arranged for each of the plurality of pixels P and a first alignment film 18 covering the pixel electrodes 15 are provided on the one surface 10s side of the first substrate 10. In addition, although not illustrated, a pixel switching element, wiring lines, and the like, which will be described below, are provided on the one surface 10s side on the liquid crystal layer 50 side of the first substrate 10. The pixel electrode 15 is formed from a light-transmissive conductive film, such as indium tin oxide (ITO).

The demarcation portion 21, a flattening film 22 covering the demarcation portion 21, a common electrode 23 covering the flattening film 22, and a second alignment film 24 covering the common electrode 23 are provided on the one surface 20s side of the second substrate 20 that faces the first substrate 10. The flattening film 22 is formed from an inorganic material, such as silicon oxide, for example. In a plan view, the demarcation portion 21 surrounds the pixel region E and overlaps with the scanning line driving circuit 102 and the inspection circuit 103. Therefore, an erroneous operation due to light is prevented by shielding light that may be incident on the scanning line driving circuit 102 and the like from the second substrate 20 side.

The common electrode 23 is formed of a light-transmissive conductive film, such as ITO, and is electrically coupled to a vertical conduction portion 106 provided on the second substrate 20. The vertical conduction portion 106 is electrically coupled to the terminals 104 via wiring lines provided on the first substrate 10.

The first alignment film 18 and the second alignment film 24 are selected based on an optical design of the liquid crystal device 100. The first alignment film 18 and the second alignment film 24 are each formed of an inorganic alignment film, such as silicon oxide (SiOx) formed by a vapor-phase growth method, and aligns liquid crystal molecules having negative dielectric anisotropy to be substantially vertical. The first alignment film 18 and the second alignment film 24 may be formed of an organic alignment film, such as polyimide having a surface that has been rubbed, and the organic alignment film aligns liquid crystal molecules having positive dielectric anisotropy to be substantially horizontal.

The liquid crystal device 100 according to the present exemplary embodiment is a transmissive type, and in accordance with an optical design of a polarizing element disposed on each of an incident side and an emission side of light with respect to the liquid crystal panel 110, the liquid crystal device 100 is configured as a liquid crystal device of a normally-white mode in which transmittance of the pixel P is maximum in a no voltage applied state, or as a liquid crystal device of a normally-black mode in which the transmittance of the pixel P is minimum in the no voltage applied state. In the present exemplary embodiment, an example is described in which the optical design of the normally-black mode is applied, using the inorganic alignment films as the first alignment film 18 and the second alignment film 24, and using the liquid crystal material having the negative dielectric anisotropy for the liquid crystal layer 50.

Electrical Configuration

Figure 3:
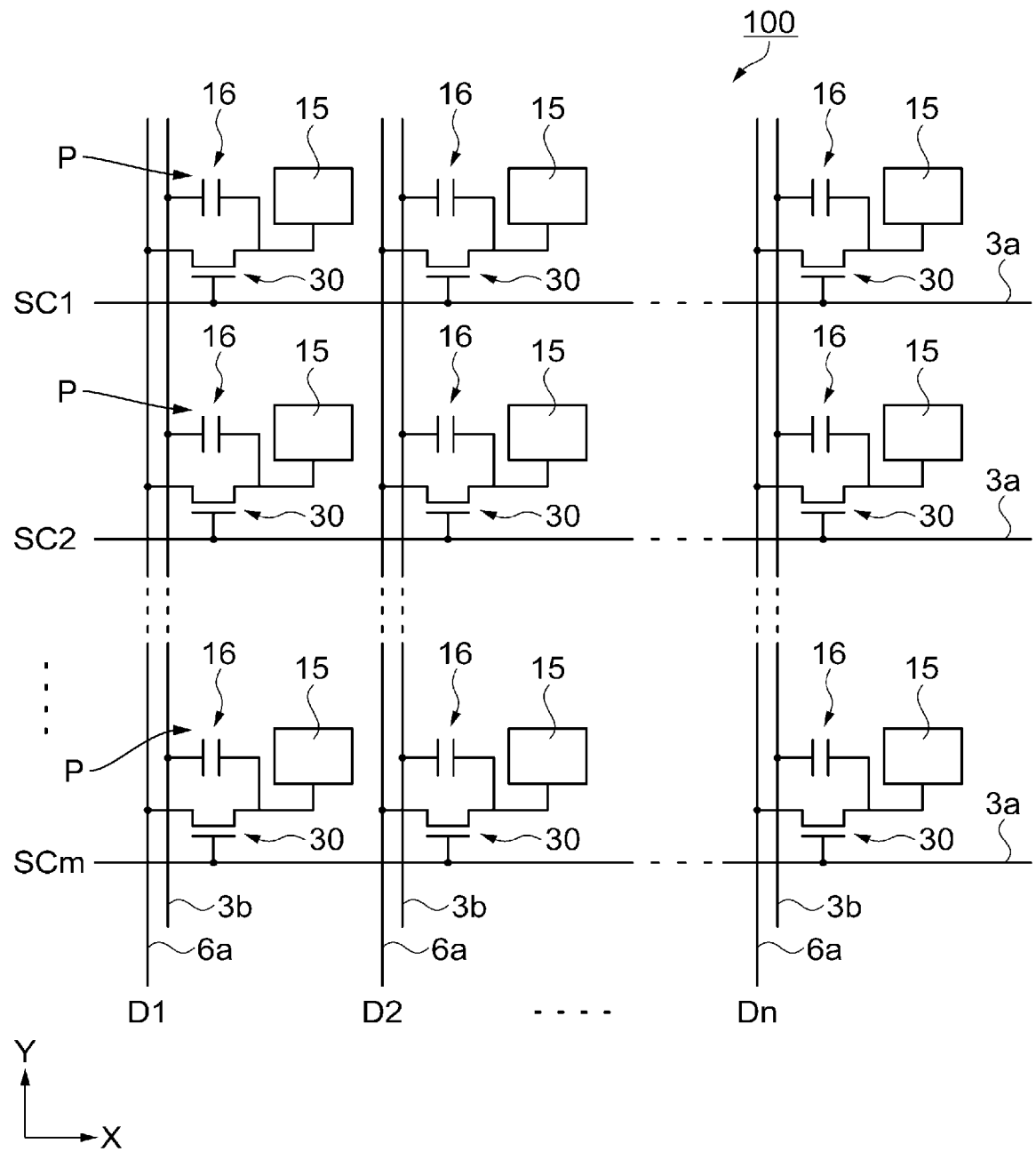
FIG. 3 is an equivalent circuit diagram illustrating an electrical configuration of the liquid crystal device illustrated in FIG. 1.

FIG. 3 is an equivalent circuit diagram illustrating an electrical configuration of the liquid crystal device 100 illustrated in FIG. 1. As illustrated in FIG. 3, the liquid crystal device 100 includes a plurality of scanning lines 3a extending in the X direction (the first direction: a row direction) at least in the pixel region E, and a plurality of data lines 6a extending in the Y direction (the second direction: a column direction). The scanning lines 3a and the data lines 6a are in an insulated state from each other in the first substrate 10. In the present exemplary embodiment, the first substrate 10 includes capacitor lines 3b that extend along the data lines 6a. In addition, the pixel P is provided to correspond to each of intersections between the plurality of scanning lines 3a and the plurality of data lines 6a. Each of the plurality of pixels P includes the pixel electrode 15, the TFT 30, and a storage capacitor 16. The scanning line 3a is electrically coupled to a gate of the TFT 30, and the data line 6a is electrically coupled to a source of the TFT 30. The pixel electrode 15 is electrically coupled to a drain of the TFT 30.

The data lines 6a are coupled to the data line driving circuit 101 illustrated in FIG. 1, and supply image signals D1, D2, . . . , and Dn supplied from the data line driving circuit 101 to the pixels P. The scanning lines 3a are coupled to the scanning line driving circuit 102 illustrated in FIG. 1, and sequentially supply scanning signals SC1, SC2, . . . , and SCm supplied from the scanning line driving circuit 102 to the pixels P. The image signals D1 to Dn supplied from the data line driving circuit 101 to the data lines 6a may be line-sequentially supplied in this order, or may be supplied to the plurality of data lines 6a adjacent to one another in groups. The scanning line driving circuit 102 line-sequentially supplies the scan signals SC1 to SCm to the scanning lines 3 at predetermined timings. In the present exemplary embodiment, a line inversion driving method is used.

In the liquid crystal device 100, during a period in which the TFT 30, which is a switching element, is turned on by an input of the scanning signals SC1 to SCm, the image signals D1 to Dn supplied from the data lines 6a are written into the pixel electrodes 15 at predetermined timings. The image signals D1 to Dn of a predetermined level written into the liquid crystal layer 50 via the pixel electrodes 15 are maintained for a certain period between the pixel electrodes 15 and the common electrode 23, which are arranged to face the pixel electrodes 15 being intervened by the liquid crystal layer 50. The frequency of the image signals D1 to Dn is 60 Hz, for example. In the present exemplary embodiment, to inhibit the image signals D1 to Dn maintained between the pixel electrodes 15 and the liquid crystal layer 15 from leaking, the storage capacitor 16 is coupled in parallel with a liquid crystal capacitor formed between the pixel electrode 15 and the common electrode 23. The storage capacitor 16 is provided between the drain of the TFT 30 and the capacitor line 3b.

The data lines 6a are coupled to the inspection circuit 103 illustrated in FIG. 1, and the inspection circuit 103 is used to verify operational defects and the like of the liquid crystal device 100 by detecting the above-described image signals in a manufacturing process of the liquid crystal device 100. Therefore, in FIG. 3, an illustration of the inspection circuit 103 is omitted. Note that in FIG. 1, the data line driving circuit 101, the scanning line driving circuit 102, and the inspection circuit 103 are illustrated as peripheral circuits formed on the outer side of the pixel region E. However, a sampling circuit that is configured to sample the above-described image signals and supply the sampled image signals to the data lines 6a, a pre-charge circuit that is configured to supply pre-charge signals of a predetermined voltage level to the data lines 6a in advance of the above-described image signals D1 to Dn, and the like may be provided as the peripheral circuits in some cases.

Configuration of Pixel P

Figure 4:
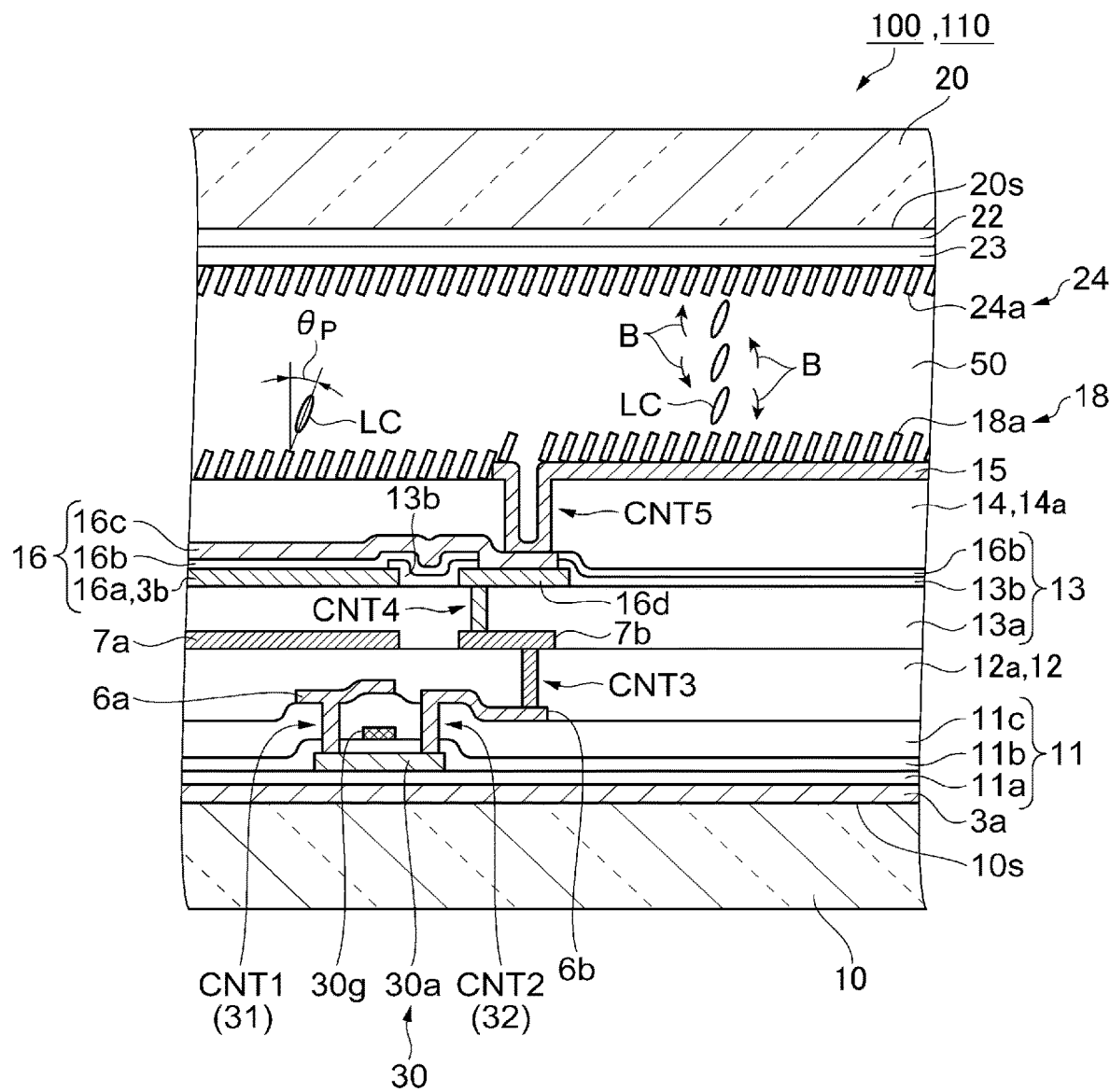
FIG. 4 is a cross-sectional view schematically illustrating a structure of a pixel illustrated in FIG. 3.

FIG. 4 is a cross-sectional view schematically illustrating a structure of the pixel P illustrated in FIG. 3. As illustrated in FIG. 4, the scanning line 3a is formed on the one surface 10s of the first substrate 10. The scanning line 3a is formed by a light shielding layer such as aluminum (Al), titanium (Ti), chromium (Cr), tungsten (W), tantalum (Ta), molybdenum (Mo), or the like.

A first insulating film 11a (an underlying insulating film) formed of silicon oxide or the like is formed on an upper layer of the scanning line 3a, and a semiconductor layer 30a is formed on an upper layer of the first insulating film 11a. The semiconductor layer 30a is formed by a polycrystalline silicon film. The semiconductor layer 30a is covered by a second insulating film (a gate insulating film) 11b formed of silicon oxide or the like, and a gate electrode 30g is formed on an upper layer of the second insulating film 11b.

A third insulating film 11c formed of silicon oxide or the like is formed on an upper layer of the gate electrode 30g, and contact holes CNT1 and CNT2 extending to a source region and a drain region of the semiconductor layer 30a are formed in the second insulating film 11b and the third insulating film 11c. The data line 6a (a source electrode) coupled to the semiconductor layer 30a through the contact holes CNT1 and CNT2, and a first relay electrode 6b (a drain electrode) are formed on an upper layer of the third insulating film 11c. The TFT 30 is configured in this manner. In the present exemplary embodiment, the TFT 30 has a lightly doped drain (LDD) structure.

A first interlayer insulating film 12a formed of silicon oxide or the like is formed on the upper layer side of the data line 6a and the first relay electrode 6b. The surface of the first interlayer insulating film 12a is flattened by chemical mechanical polishing (CMP) processing or the like. A contact hole CNT3 extending to the first relay electrode 6b is formed in the first interlayer insulating film 12a, and a wiring line 7a and a second relay electrode 7b electrically coupled to the first relay electrode 6b through the contact hole CNT3 are formed on an upper layer of the first interlayer insulating film 12a. The wiring line 7a is formed to overlap with the semiconductor layer 30a of the TFT 30 and the data line 6a in a plan view, and functions as a shield layer to which a fixed potential is applied.

A second interlayer insulating film 13a formed of silicon oxide or the like is formed on the upper layer side of the wiring line 7a and the second relay electrode 7b. The surface of the second interlayer insulating film 13a is flattened by the CMP processing or the like. A contact hole CNT4 extending to the second relay electrode 7b is formed in the second interlayer insulating film 13a.

Using a light shielding metal or the like, a first capacitor electrode 16a and a third relay electrode 16d are formed on an upper layer of the second interlayer insulating film 13a. The first capacitor electrode 16a is the capacitor line 3b formed to extend across the plurality of pixels P, and a fixed potential is supplied to the first capacitor electrode 16a. An insulating film 13b is formed on an upper layer of the first capacitor electrode 16a and the third relay electrode 16d, to cover an outer edge of the first capacitor electrode 16a, an outer edge of the third relay electrode 16d, and the like. A dielectric layer 16b is formed on the upper layer side of the first capacitor electrode 16a and the insulating film 13b. The dielectric layer 16b is formed by a silicon nitride film, hafnium oxide ($HfO_2$), alumina ($Al_2O_3$), tantalum oxide ($Ta_2O_5$), or the like. A second capacitor electrode 16c formed of titanium nitride (TiN) or the like is formed on an upper layer of the dielectric layer 16b, and the storage capacitor 16 is configured by the first capacitor electrode 16a, the dielectric layer 16b, and the second capacitor electrode 16c. The second capacitor electrode 16c is electrically coupled to the third relay electrode 16d through a removed portion of the dielectric layer 16b and the insulating film 13b.

A fourth interlayer insulating film 14a formed of silicon oxide or the like is formed on the upper layer side of the second capacitor electrode 16c, and the surface of the fourth interlayer insulating film 14a is flattened by the CMP processing or the like. A contact hole CNT5 extending to the second capacitor electrode 16c is formed in the fourth interlayer insulating film 14a. The pixel electrodes 15 formed by a light-transmissive conductive film such as ITO are formed on an upper layer of the fourth interlayer insulating film 14a, and the pixel electrodes 15 are electrically coupled to the second capacitor electrode 16c through the contact hole CNT5.

In the liquid crystal device 100 configured in this manner, a plurality of wiring lines are formed on the one surface 10s side of the first substrate 10, and a wiring portion is indicated using reference signs of the insulating films and the interlayer insulating films that perform insulation between the wiring lines. In other words, the first insulating film 11a, the second insulating film 11b, and the third insulating film 11c are collectively referred to as a wiring layer 11. A representative wiring line of the wiring layer 11 is the scanning line 3a. A representative wiring line of a wiring layer 12 is the data line 6a. The second interlayer insulating film 13a, the insulating film 13b, and the dielectric layer 16b are collectively referred to as a wiring layer 13, and a representative wiring line of the wiring layer 13 is the wiring line 7a. Similarly, a representative wiring line of a wiring layer 14 is the capacitor line 3b as the first capacitor electrode 16a.

Configuration of Liquid Crystal Layer 50 and the Like

The first alignment film 18 and the second alignment film 24 are the inorganic alignment films, and are respectively formed of an aggregate of columns 18a and 24a, which are obtained by diagonally depositing and growing an inorganic material such as silicon oxide in a columnar shape. Thus, in the liquid crystal layer 50, liquid crystal molecules LC have a pre-tilt angle θp of 3° to 5° with respect to the normal direction with respect to the first substrate 10 and the second substrate 20, and are substantially aligned vertically (VA: Vertical Alignment). When a driving signal is applied between the pixel electrodes 15 and the common electrode 23, an inclination of the liquid crystal molecules LC changes in accordance with an electric field direction generated between the pixel electrodes 15 and the common electrode 23.

Behavior of Ionic Impurities

Figure 5:
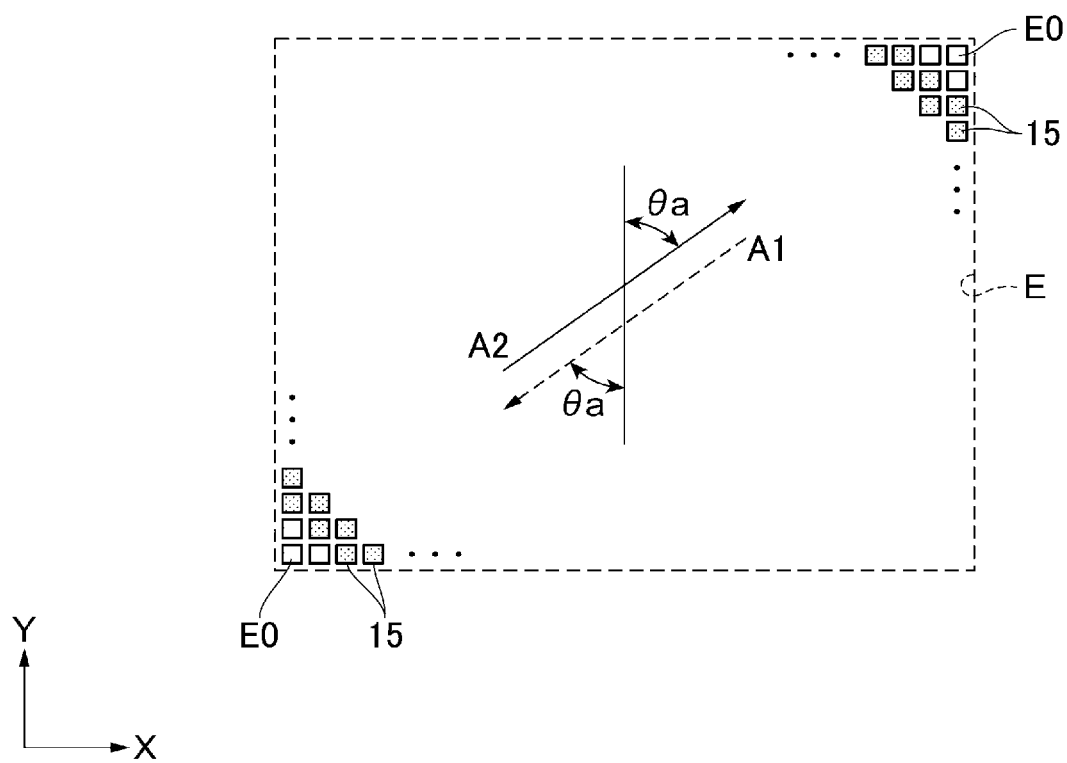
FIG. 5 is an explanatory diagram schematically illustrating behavior of ionic impurities in the liquid crystal device illustrated in FIG. 1.

FIG. 5 is an explanatory diagram schematically illustrating the behavior of the ionic impurities in the liquid crystal device 100 illustrated in FIG. 1. FIG. 5 illustrates a state in which the liquid crystal device 100 is viewed from the second substrate 20 side. In FIG. 5, a diagonal deposition direction applied when forming the first alignment film 18 on the first substrate 10 is, for example, a direction indicated by a dashed arrow A1, and is a direction that forms an angle θa in the Y direction. A diagonal deposition direction applied when forming the second alignment film 24 on the second substrate 20 is, for example, a direction indicated by a solid arrow A2, and is a direction that forms the angle θa in the Y direction. The angle θa is 45 degrees, for example. The diagonal deposition direction applied when forming the first alignment film 18 on the first substrate 10 is opposite to the diagonal deposition direction applied when forming the second alignment film 24 on the second substrate 20.

In the liquid crystal device 100 configured in this manner, when the liquid crystal layer 50 is driven, the liquid crystal molecules LC vibrate, as indicated by arrows B in FIG. 4, and a flow of the liquid crystal molecules LC occurs in the diagonal deposition directions indicated by the dashed arrow A1 and the solid arrow A2 illustrated in FIG. 5. Therefore, when the ionic impurities are included in the liquid crystal layer 50, the ionic impurities move toward corners E0 of the pixel region E along the flow of the liquid crystal molecules LC, and become unevenly distributed. In a region where the ionic impurities are unevenly distributed, the insulating resistance of the liquid crystal layer 50 deteriorates, which leads to a decrease in driving potential. As a result, display unevenness or an image sticking phenomenon due to energization is generated at the corners E0. In particular, when inorganic alignment films are used for the first alignment film 18 and the second alignment film 24, since the inorganic alignment films easily adsorb the ionic impurities, the display unevenness or the image sticking phenomenon are more likely to be generated in comparison with organic alignment films. Thus, as will be described below, in the liquid crystal device 100 of the present exemplary embodiment, while the ionic impurities in the pixel region E are swept to end portions of the pixel region E by the voltage applied to the pixel electrodes 15, an ion trap mechanism 130 is provided, and using the ion trap mechanism 130, the ionic impurities in the pixel region E are swept in directions away from the pixel region E.

Explanation of Ion Trap Mechanism 130 and the Like

Figure 6:
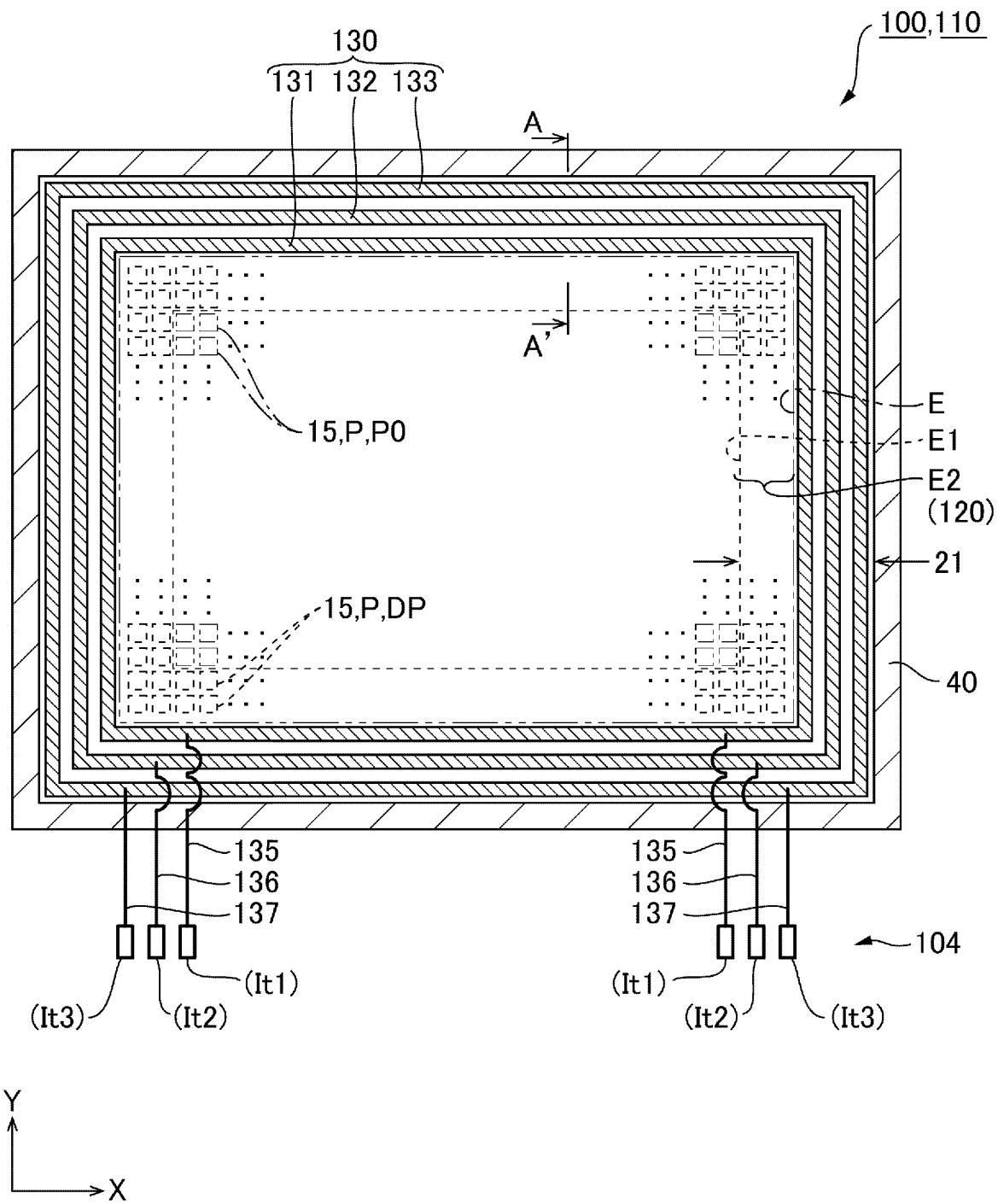
FIG. 6 is an explanatory diagram of a pixel region in the liquid crystal device illustrated in FIG. 1.
Figure 7:
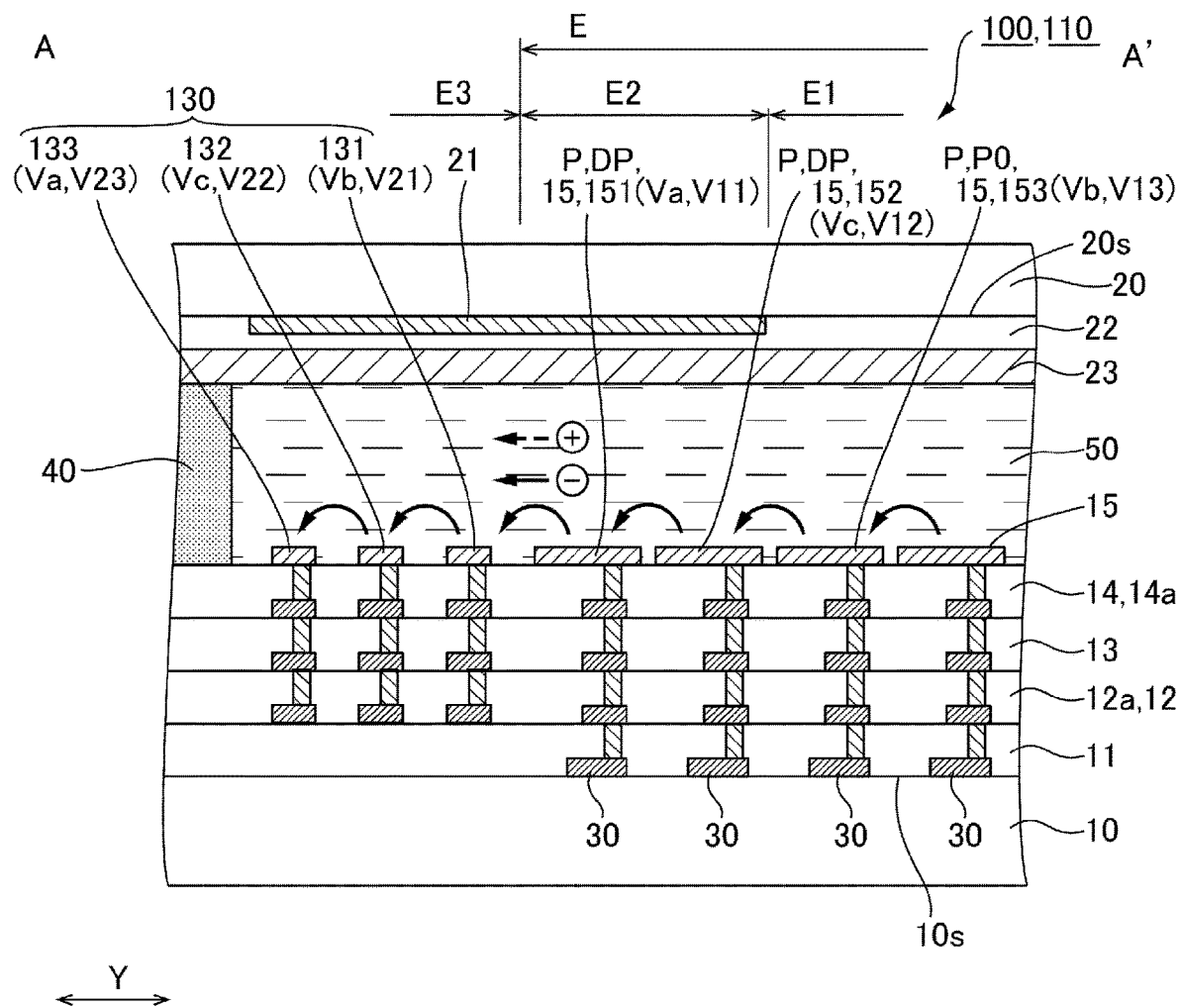
FIG. 7 is a cross-sectional view schematically illustrating a state in which a liquid crystal panel is cut along a line A-A' in FIG. 6.

FIG. 6 is an explanatory diagram of the pixel region E in the liquid crystal device 100 illustrated in FIG. 1. FIG. 7 is a cross-sectional view schematically illustrating a state in which the liquid crystal panel 110 is cut along a line A-A' in FIG. 6. As illustrated in FIG. 6 and FIG. 7, the plurality of pixels P are arranged in the X direction and the Y direction in the pixel region E of the liquid crystal device 100 of the present exemplary embodiment, and each of the plurality of pixels P includes the pixel electrode 15 electrically coupled to the TFT 30. The pixel P and the pixel electrode 15 have the same planar shape, size, arrangement pitch, and the like. In the present exemplary embodiment, a dimension of one side of the pixel electrode 15 is 7.5 μm, for example, and a gap between the two adjacent pixel electrodes 15 is 0.5 μm, for example.

In the present exemplary embodiment, the pixel region E includes a display region E1 in which, of the plurality of pixels P, display pixels P0 that directly contribute to display are arranged, and, around the display region E1, a dummy pixel region E2 that includes a plurality of dummy pixels DP that do not directly contribute to the display. In the following description, of the plurality of pixel electrodes 15, each of the pixel electrodes 15 provided in the display pixels P0 is an effective pixel electrode, and each of the pixel electrodes 15 provided in the dummy pixels DP is a dummy pixel electrode. In the aspect illustrated in FIG. 6, two pairs of columns of the dummy pixels DP are arranged in the dummy pixel region E2 with the display region E1 interposed between each pair of columns of the dummy pixels D in the X direction, and two pairs of rows of the dummy pixels DP are arranged with the display region E1 interposed between each pair of rows of the dummy pixels DP in the Y direction. However, the number of dummy pixels DP arranged in the dummy pixel region E2 is not limited to this example, and it is sufficient that at least one pair of the dummy pixels DP is arranged in each of the X direction and the Y direction with the display region E1 interposed between the one pair of the dummy pixels DP. In addition, the number of dummy pixels DP may be three or more, and the number of dummy pixels DP arranged in the X direction and the Y direction may be different.

In the present exemplary embodiment, the demarcation portion 21 is provided to overlap with the dummy pixel region E2 in a plan view, and contrast of a displayed image is increased by inhibiting unwanted stray light from being incident the display region E1.

When configuring the ion trap mechanism 130 on the liquid crystal device 100 configured in this manner, a first electrode 131 interposed between the pixel region E and the sealing material 40 in a plan view and a second electrode 132 interposed by the first electrode 131 and the sealing material 40 in a plan view are provided on one of the first substrate 10 and the second substrate 20. In addition, a third electrode 133 interposed between the second electrode 132 and the sealing material 40 in a plan view is provided on the one substrate. In the present exemplary embodiment, the first electrode 131, the second electrode 132, and the third electrode 133 are each formed in a quadrangular frame shape surrounding the pixel region E in a plan view, on the first substrate 10 side.

To supply power to the first electrode 131, the second electrode 132, and the third electrode 133, for example, first ends of a pair of routing wiring lines 135 extending in the Y direction are electrically coupled in the proximity of both end portions, of the first electrode 131, extending in the X direction, and the second ends of the routing wiring lines 135 are electrically coupled to the terminals 104 formed on the first substrate 10. The terminals 104 to which the pair of routing wiring lines 135 are electrically coupled are referred to as terminals 104 (It1) to distinguish them from the other terminals 104. First ends of a pair of routing wiring lines 136 extending in the Y direction are electrically coupled in the proximity of both end portions, of the second electrode 132, extending in the X direction, and the second ends of the routing wiring lines 136 are electrically coupled to the terminals 104 formed on the first substrate 10. The terminals 104 to which the pair of routing wiring lines 136 are electrically coupled are referred to as terminals 104 (It2) to distinguish them from the other terminals 104. First ends of a pair of routing wiring lines 137 extending in the Y direction are electrically coupled in the proximity of both end portions, of the third electrode 133, extending in the X direction, and the second ends of the routing wiring lines 137 are electrically coupled to the terminals 104 formed on the first substrate 10. The terminals 104 to which the pair of routing wiring lines 137 are electrically coupled are referred to as terminals 104 (It3) to distinguish them from the other terminals 104.

In this manner, the ion trap mechanism 130 is configured by the first electrode 131, the second electrode 132, the third electrode 133, the routing wiring lines 135, 136, and 137, and the terminals 104 (It1, It2, and It3). In the present exemplary embodiment, to suppress a variation in signals supplied to the first electrode 131, the second electrode 132, and the third electrode 133 depending on positions of the first electrode 131, the second electrode 132, and the third electrode 133, a configuration is adopted in which the signal is supplied from two of the terminals 104 (It1, It2, and It3), but the present disclosure is not limited to this configuration.

Each of the terminals 104 (It1, It2, and It3) may be one or may be three or more. Further, each of the first electrode 131, the second electrode 132, and the third electrode 133 is not limited to an aspect of the electrically closed quadrangular electrode in a plan view, and may be a state (open state) in which one end is electrically coupled to the routing wiring lines 135, 136, and 137 with the other end is opened.

As illustrated in FIG. 7, in the present exemplary embodiment, the plurality of wiring layers 11 to 14 are provided on the one surface 10s side of the first substrate 10, and the pixel electrodes 15, the first electrode 131, the second electrode 132, and the third electrode 133 are each formed on the upper layer of the fourth interlayer insulating film 14a. More specifically, the pixel electrodes 15, the first electrode 131, the second electrode 132, and the third electrode 133 are formed by patterning the same light-transmissive conductive film in a process of forming the pixel electrode 15. Further, the routing wiring lines 135, 136, and 137 are electrically coupled to the terminals 104 (It1, It2, and It3) using a similar configuration to that of the wiring layers 11 to 14.

Figure 8:
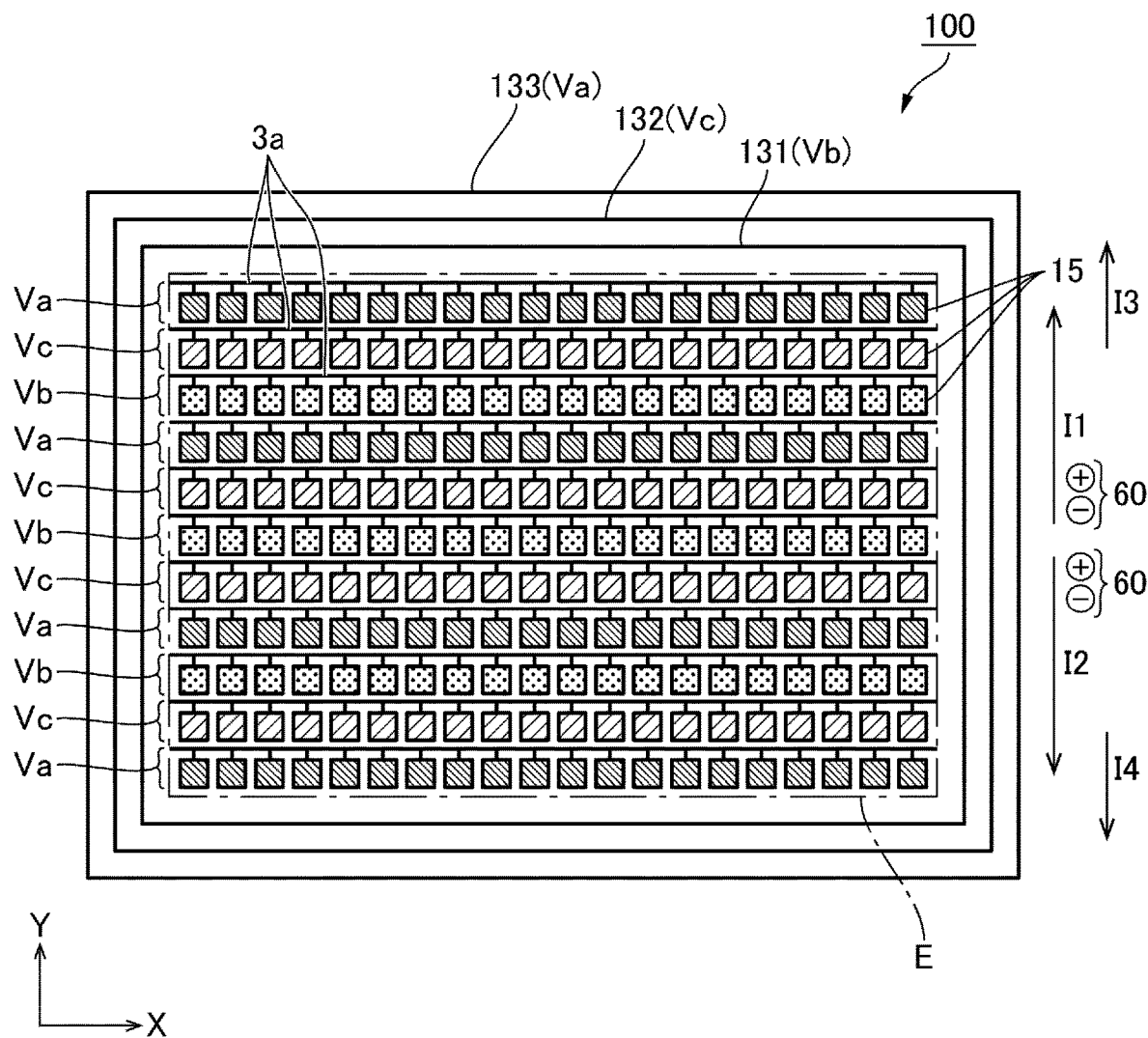
FIG. 8 is an explanatory diagram illustrating an operation of sweeping the ionic impurities in the pixel region illustrated in FIG. 6 to end portions of the pixel region.
Figure 9:
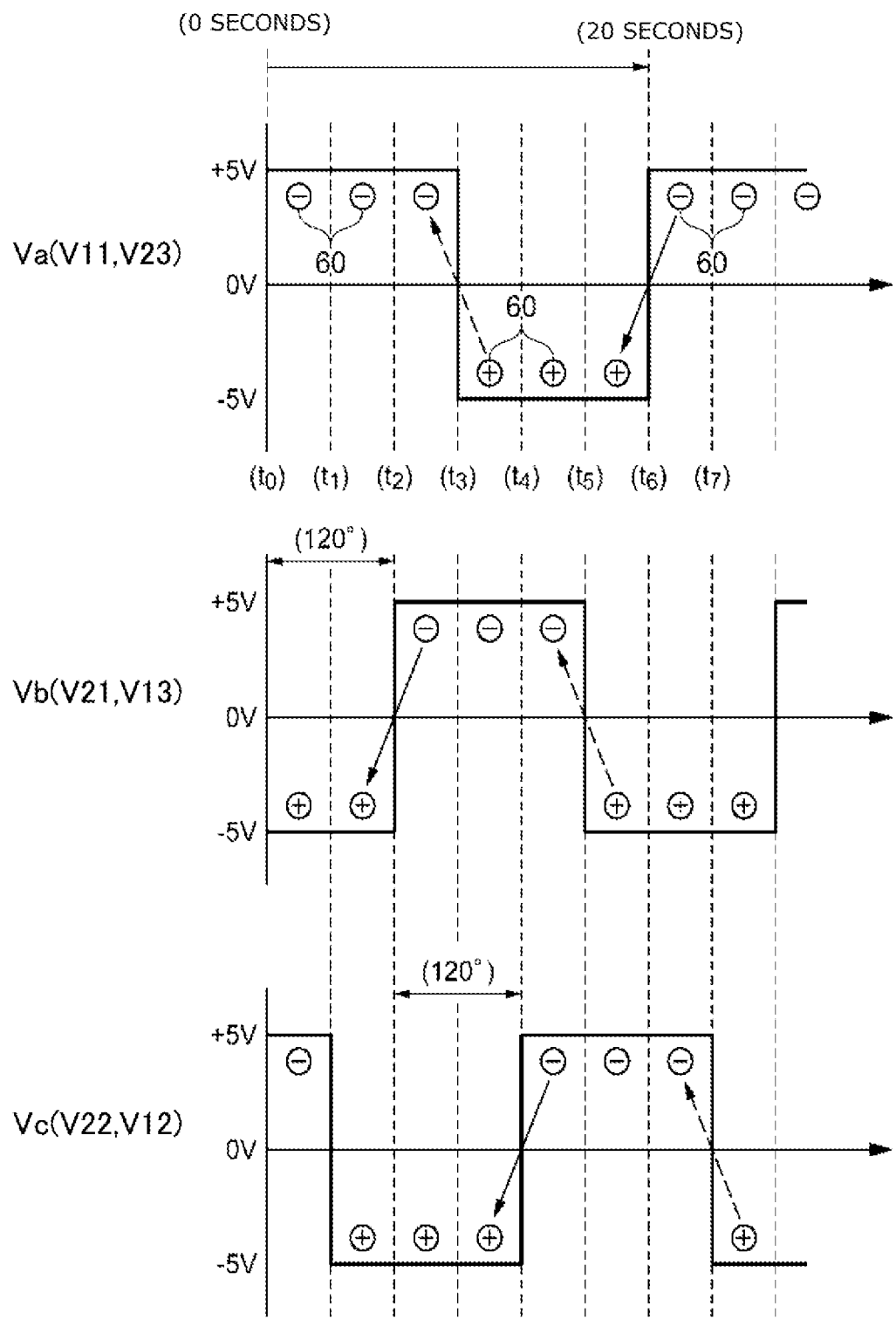
FIG. 9 is an explanatory diagram of signals for performing the sweeping illustrated in FIG. 8.

Method for Driving Liquid Crystal Device 100 FIG. 8 is an explanatory diagram illustrating an operation of sweeping the ionic impurities in the pixel region E illustrated in FIG. 6 to the end portions of the pixel region E, and the like. FIG. 9 is an explanatory diagram of signals for performing the sweeping illustrated in FIG. 8. In the present exemplary embodiment, in FIG. 3, the scanning signals SC1, SC2, . . . , and SCm are supplied from the scanning line driving circuit 102 illustrated in FIG. 1 to each of the plurality of scanning lines 3a, and the TFTs 30 are sequentially turned on for a fixed period. Then, data signals are simultaneously supplied from the data line driving circuit 101 to all of the data lines 6a, and the voltage of the plurality of pixel electrodes 15 in the pixel region E is controlled. Further, signals are supplied to the terminals 104 (It1, It2, and It3) illustrated in FIG. 6, and the voltage of the ion trap electrodes (the first electrode 131, the second electrode 132, and the third electrode 133) is controlled.

As illustrated in FIG. 7, in the present exemplary embodiment, the ionic impurities in the pixel region E are swept to end portions of the pixel region E in the Y direction, from the center in the Y direction toward both of the end portions in the Y direction, by all of the pixel electrodes 15 in the pixel region E during a period in which image display is being paused. Further, during the period in which the image display is being paused and during a period in which an image is being displayed, the ion impurities in the pixel region E are swept in the direction away from the pixel region E by the pixel electrodes 15 (the dummy pixel electrodes) of the dummy pixel region E2 and by the ion trap electrodes (the first electrode 131, the second electrode 132, and the third electrode 133).

More specifically, during the period in which the image is being displayed, image signals are supplied to the pixel electrodes 15 (the effective pixel electrodes) in the display region E1. Meanwhile, when the liquid crystal panel 110 is cut in the Y direction, of the plurality of pixel electrodes 15, a first signal V11 of a first phase Va is supplied to a first pixel electrode 151 (a dummy pixel electrode) adjacent to the first electrode 131. Further, a second signal V21 of a second phase Vb whose phase is delayed with respect to the first signal V11 is supplied to the first electrode 131, a third signal V22 of a third phase Vc whose phase is delayed with respect to the second signal V21 is supplied to the second electrode 132, and a signal V23 whose phase is delayed with respect to the third signal V22 is supplied to the third electrode 133.

Furthermore, of the plurality of pixel electrodes 15, a fourth signal V12 whose phase is advanced with respect to the first signal V11 is supplied to a second pixel electrode 152 (a dummy pixel electrode), which is adjacent to the first pixel electrode 151 on the opposite side to the first electrode 131.

Here, the first signal V11, the second signal V21, and the third signal V22 are AC signals having the same frequency, and the first phase Va, the second phase Vb, and the third phase Vc have a phase shift of 120° with respect to each other, as illustrated in FIG. 9. Thus, a phase of the signal V23 applied to the third electrode 133 is the first phase Va, and a phase of the signal V12 applied to the second pixel electrode 152 is the third phase Vc. Further, signals, such as the first signal V11, the second signal V21, and the third signal V22, which are used to sweep the ion impurities, are AC signals having the same waveform and also having the same amplitudes. In the present exemplary embodiment, each of the above-described signals is a signal that transitions between a high potential and a low potential with a common potential (LCCOM) applied to the common electrode 23 being a reference potential. The frequency of the first signal V11, the second signal V21, and the third signal V22 is 10 mHz to 50 mHz, for example. When the frequency is 50 mHz, a duration of one cycle of the AC signal is 20 seconds. In the present exemplary embodiment, a maximum voltage difference in the driving signal applied between the pixel electrodes 15 (the effective pixel electrodes) of the display region E1 and the common electrode 23 is equal to a voltage corresponding to ½ of a maximum amplitude voltage of the first signal V11, the second signal V21, and the third signal V22.

The AC signals illustrated in FIG. 9 are AC signals of a rectangular wave, and along with times t0, t1, t2 . . . , the first signal V11 of the first phase Va transitions from a positive polarity (+) or the reference potential to a negative polarity (−), and then, before the first signal V11 of the first phase Va transitions to the reference potential or the positive polarity (+), the second signal V21 of the second phase Vb transitions from the positive polarity (+) or the reference potential to the negative polarity (−). Further, after the second signal V21 of the second phase Vb transitions to the negative polarity (−), and before the second signal V21 of the second phase Vb transitions to the reference potential or the positive polarity (+), the third signal V22 of the third phase Vc transitions from the positive polarity (+) or the reference potential to the negative polarity (−). Further, after the first signal V11 of the first phase Va transitions from the negative polarity (−) or the reference potential to the positive polarity (+), and before the first signal V11 of the first phase Va transitions to the negative polarity (−), the second signal V21 of the second phase Vb transitions from the negative polarity (−) or the reference potential to the positive polarity (+). Furthermore, after the second signal V21 of the second phase Vb transitions from the negative polarity (−) or the reference potential to the positive polarity (+), and before the second signal V21 of the second phase Vb transitions to the reference potential or the negative polarity (−), the third signal V22 of the third phase Vc transitions from the negative polarity (−) or the reference potential to the positive polarity (+). Note that the AC signals of the rectangular wave illustrated in FIG. 9 transition between a high potential (5V) and a low potential (−5V) with the reference potential being 0V, but the setting of the reference potential, the high potential, and the low potential is not limited to this example.

Meanwhile, during the period in which the image display is being paused, the above-described signals are supplied to the ion trap electrodes (the first electrode 131, the second electrode 132, and the third electrode 133), and as illustrated in FIG. 8, with respect to all the pixel electrodes 15 in the pixel region E1, the signals of the first phase Va, the second phase Vb, and the third phase Vc are applied to each column of the pixel electrodes 15 corresponding to each of the scanning lines 3a from the center in the Y direction toward both of the end portions in the Y direction. Therefore, as illustrated in FIG. 7, of the plurality of pixel electrodes 15, the signal V13 whose phase is advanced with respect to the first signal V11 is applied to a third pixel electrode 153 (an effective pixel electrode), which is adjacent to the second pixel electrode 152 (the dummy pixel electrode) on the opposite side to the first electrode 131, where a phase of the signal V13 is the second phase Vb.

Thus, as illustrated in FIG. 8 and FIG. 9, during the period in which the image display is being paused, ionic impurities 60 in the pixel region E that have the positive polarity (+) and the negative polarity (−) are each swept from the center in the Y direction toward both of the end portions in the Y direction by an electric field generated between each of the adjacent pixel electrodes 15, as indicated by arrows I1 and I2. In addition, the ionic impurities 60 that have the positive polarity (+) and the negative polarity (−) and that have been swept to both of the end portions of the pixel region E in the Y direction are each swept in the direction away from the pixel region E in the Y direction by an electric field generated between each of the adjacent electrodes of the first pixel electrode 151 (the dummy pixel electrode) and the ion trap electrodes (the first electrode 131, the second electrode 132, and the third electrode 133), as indicated by arrows I3 and I4.

Note that the frequency of the signals for sweeping the ions is preferably 10 mHz to 50 mHz, but when the frequency is too low, a state similar to that in which a direct current is applied between the pixel electrodes 15 and the common electrode 23 may be obtained, and there is a risk that a display defect, such as liquid crystal decomposition, image sticking, stain, and the like arises. In addition, when the frequency is higher than the above-described range, the ionic impurities cannot follow a scrolling velocity of the electric field, and there is a risk that the ionic impurities cannot be swept away. Further, in the present exemplary embodiment, a difference between a time average voltage of each of the signals and a reference potential is substantially 0V. Specifically, the difference is preferably 100 mV or less. When the difference is 100 mV or more, the image sticking may be generated. When the difference is 100 mV or less, the image sticking is less likely to be generated.

Main Effects of Exemplary Embodiment

As described above, in the present exemplary embodiment, the first electrode 131 is provided between the pixel region E and the sealing material 40, and the second electrode 132 is provided between the first electrode 131 and the sealing material 40. In addition, of the plurality of pixel electrodes 15 in the pixel region E, the first signal V11 of the first phase Va is supplied to the first pixel electrode 151 adjacent to the first electrode 131, the second signal V21 of the second phase Vb that has a phase delay with respect to the first signal V11 is applied to the first electrode 131, and the third signal V22 of the third phase Vc that has a phase delay with respect to the second signal V21 is applied to the second electrode 132. Thus, the ionic impurities in the pixel region E are swept toward the first electrode 131 by the electric field between the first pixel electrodes 15 and the first electrode 131, and the ionic impurities in the pixel region E are then swept toward the second electrode 132 by the electric field between the first electrode 131 and the second electrode 132. Therefore, the ionic impurities in the pixel region E can be efficiently swept out from the pixel region E, and the ionic impurities are therefore less likely to affect the display quality.

In addition, after sweeping the ionic impurities in the pixel region E to the end portions of the pixel region E using the signals applied to the pixel electrodes 15 in the pixel region E, the ion impurities swept to the end portions of the pixel region E are then swept toward the first electrode 131, using the electric field between the first pixel electrodes 15 and the first electrode 131. Therefore, the ionic impurities of the pixel region E are less likely to be unevenly distributed in the pixel region E, and the ionic impurities are therefore less likely to affect the display quality. In addition, since the sweeping of the ionic impurities is performed in the Y direction, which is the smaller dimension of the pixel region E, the sweeping of the ionic impurities from the pixel region E can be efficiently carried out. In addition, since the sweeping of the ionic impurities is performed in the Y direction in which the scanning lines 3a are aligned, the sweeping of the ionic impurities can be performed using a normal circuit configuration of the liquid crystal device 100 by varying the driving method.

In particular, when the first alignment film 18 and the second alignment film 24 are provided using an inorganic material, the ionic impurities tend to be easily absorbed, but even in this case, according to the present exemplary embodiment, the ionic impurities are less likely to affect the display quality.

Exemplary Embodiment 2

Figure 10:
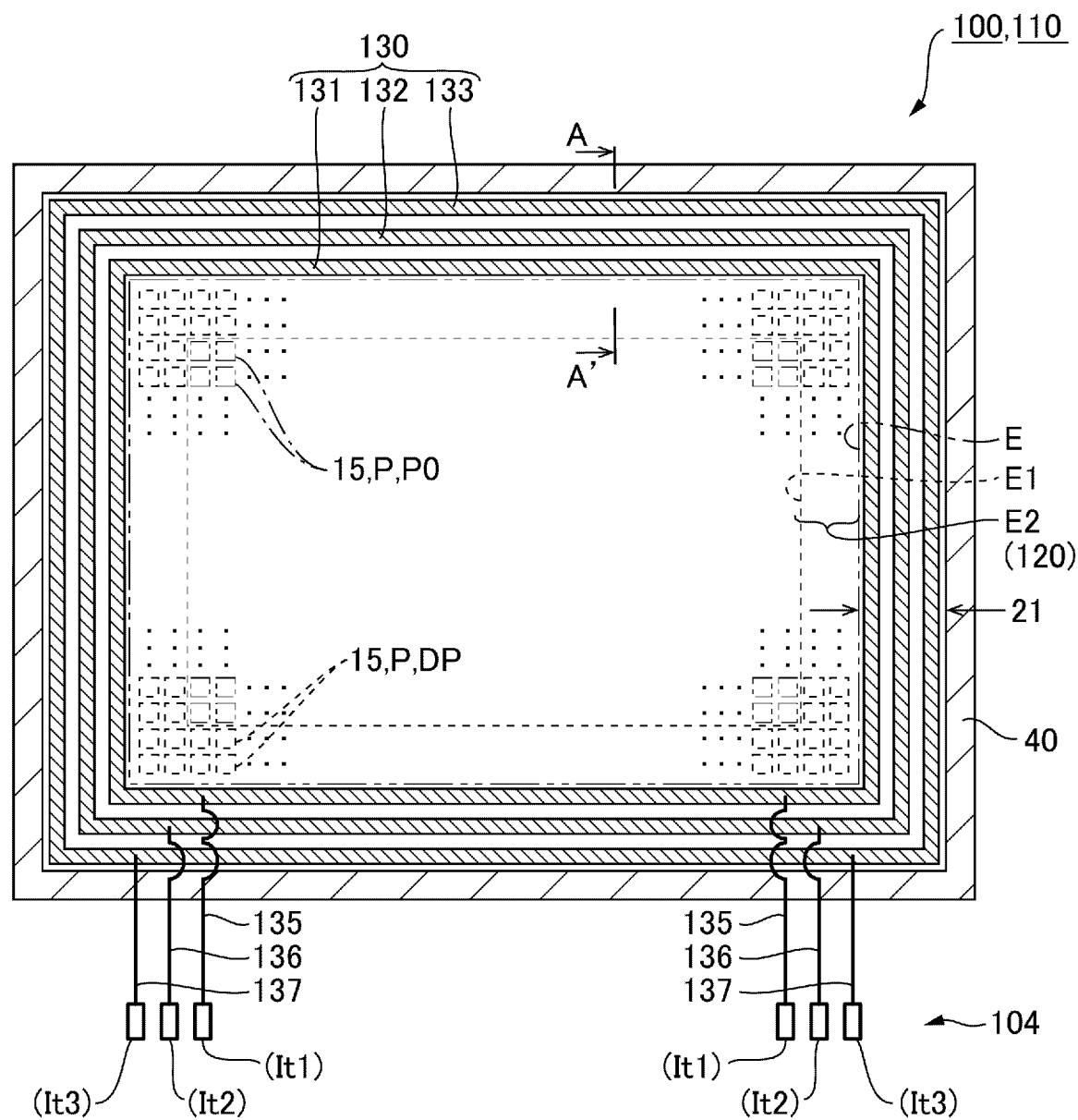
FIG. 10 is an explanatory diagram of the liquid crystal device according to Exemplary Embodiment 2 of the present disclosure.
Figure 11:
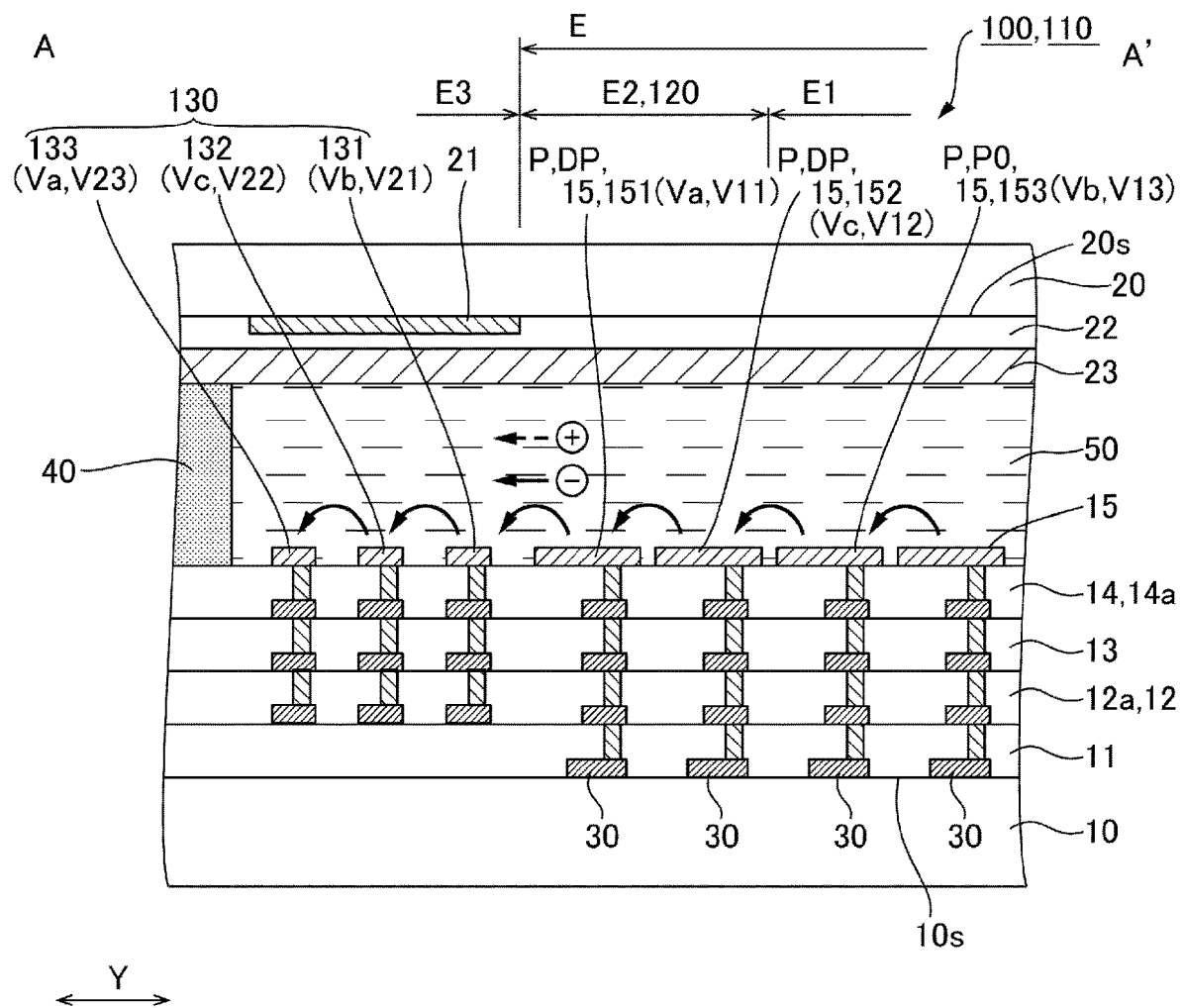
FIG. 11 is a cross-sectional view schematically illustrating a state in which the liquid crystal panel is cut along a line A-A' in FIG. 10.

FIG. 10 is an explanatory diagram of the liquid crystal device 100 according to Exemplary Embodiment 2 of the present disclosure, and is a plan view schematically illustrating a plan view configuration of the display region E and the like. FIG. 11 is a cross-sectional view schematically illustrating a state in which the liquid crystal panel 110 is cut along the line A-A' in FIG. 10. Accordingly, FIG. 10 corresponds to FIG. 6 referenced in Exemplary Embodiment 1, and FIG. 11 corresponds to FIG. 7 referenced in Exemplary Embodiment 1. Note that the basic configuration of this exemplary embodiment and exemplary embodiments to be described later is the same as the configuration of Exemplary Embodiment 1, and thus the same reference symbols are assigned to common portions and a description of the common portions will be omitted.

In Exemplary Embodiment 1, the demarcation portion 21 overlaps with the dummy pixel electrodes (the first pixel electrode 151 and the second pixel electrode 152) in a plan view, but as illustrated in FIG. 10 and FIG. 11, in the present exemplary embodiment, the demarcation portion 21 does not overlap with the dummy pixel electrodes (the first pixel electrode 151 and the second pixel electrode 152), and the dummy pixel region E2 configures a light shielding demarcation along with the demarcation portion 21, as an electronic demarcation 120. Therefore, the ion trap electrodes (the first electrode 131, the second electrode 132, and the third electrode 133) are supplied with signals having an amplitude of ±5V. However, during the display of the image, signals that perform black display even at its maximum voltage value are applied to the dummy pixel electrodes (the first pixel electrode 151 and the second pixel electrode 152).

For example, ±0.5V signals are supplied to the dummy pixel electrodes (the first pixel electrode 151 and the second pixel electrode 152).

Exemplary Embodiment 3

Figure 12:
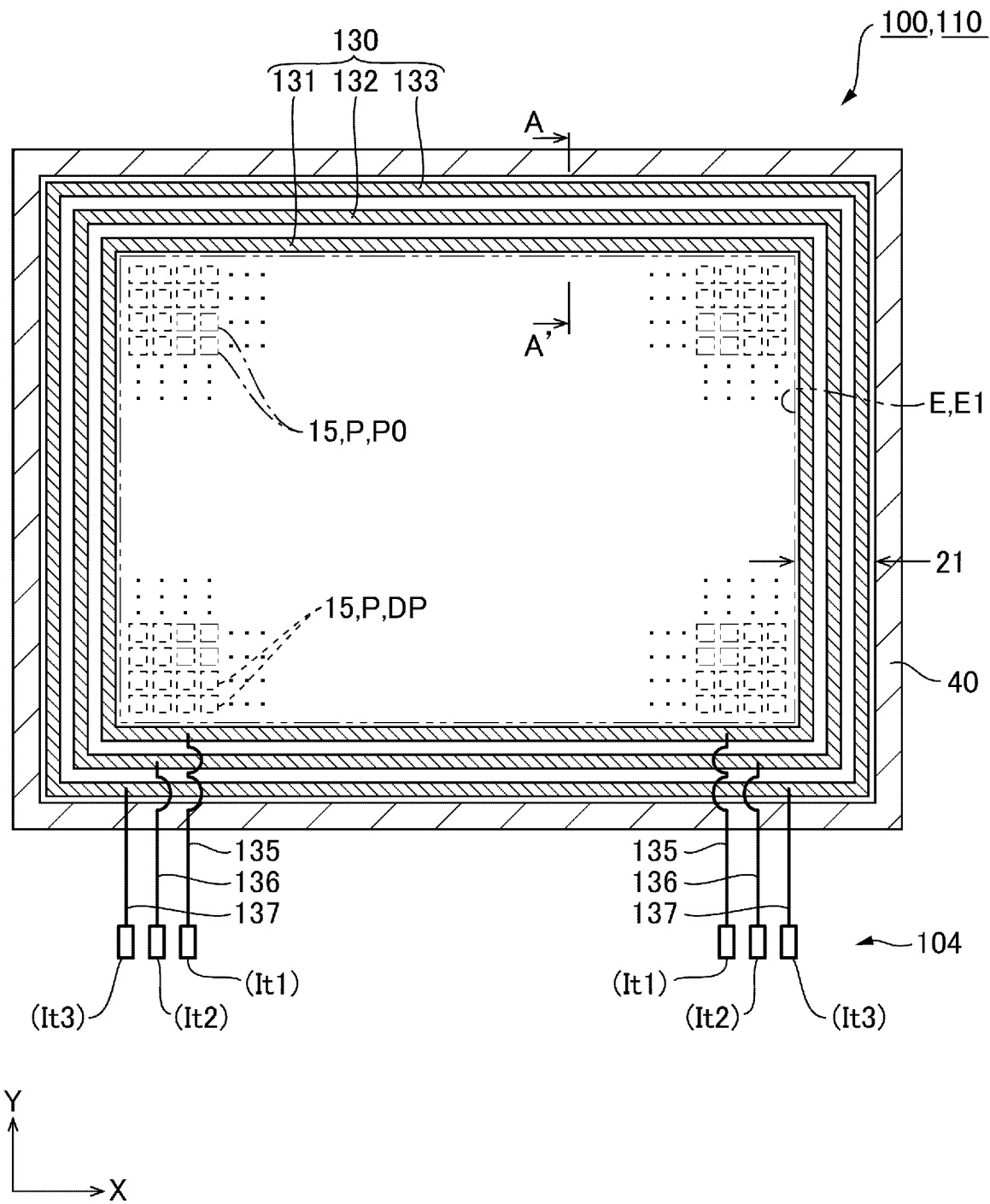
FIG. 12 is an explanatory diagram of the liquid crystal device according to Exemplary Embodiment 3 of the present disclosure.
Figure 13:
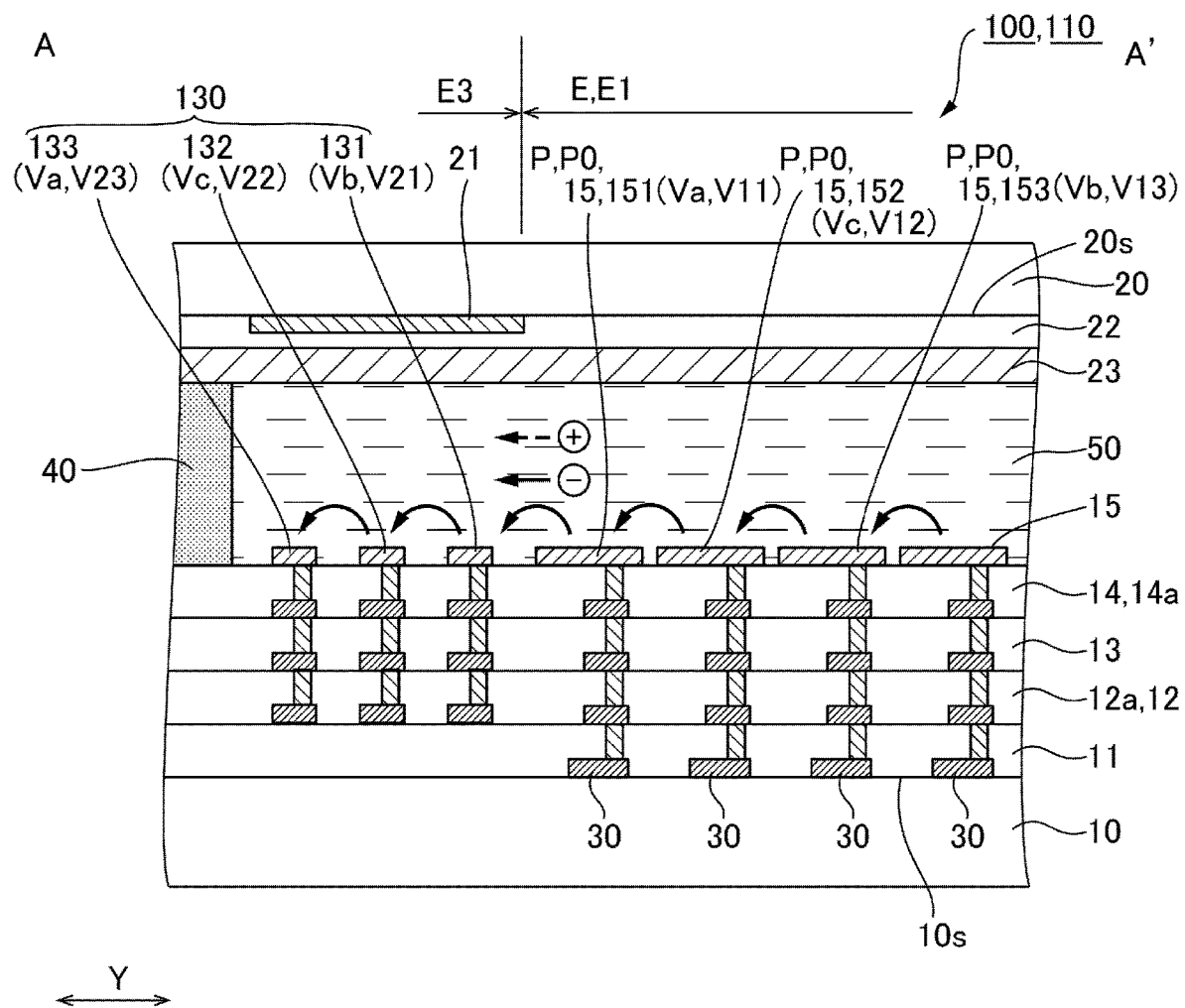
FIG. 13 is a cross-sectional view schematically illustrating a state in which the liquid crystal panel is cut along a line A-A' in FIG. 12.

FIG. 12 is an explanatory diagram of the liquid crystal device 100 according to Exemplary Embodiment 3 of the present disclosure, and is a cross-sectional view schematically illustrating a plan view configuration of the pixel region E and the like. FIG. 13 is a cross-sectional view schematically illustrating a state in which the liquid crystal panel 110 is cut along a line A-A' in FIG. 12. Accordingly, FIG. 12 corresponds to FIG. 6 referenced in Exemplary Embodiment 1, and FIG. 13 corresponds to FIG. 7 referenced in Exemplary Embodiment 1.

In Exemplary Embodiments 1 and 2, the dummy pixel electrodes (the first pixel electrode 151 and the second pixel electrode 152) are provided in the pixel region E, but, as illustrated in FIG. 12 and FIG. 13, in the present exemplary embodiment, the dummy pixel electrodes (the first pixel electrode 151 and the second pixel electrode 152) are not provided in the pixel region E. Therefore, the entire pixel region E is the display region E1. In the present exemplary embodiment, the sweeping of the ionic impurities is performed only during the period of time in which the image is not displayed, for example. Note that the sweeping of the ionic impurities can be constantly performed. Thus, when performing the sweeping of the ionic impurities, the signals of ±5.0V may be supplied to the ion trap electrodes (the first electrode 131, the second electrode 132, and the third electrode 133) and the pixel electrodes 15.

Exemplary Embodiment 4

Figure 14:
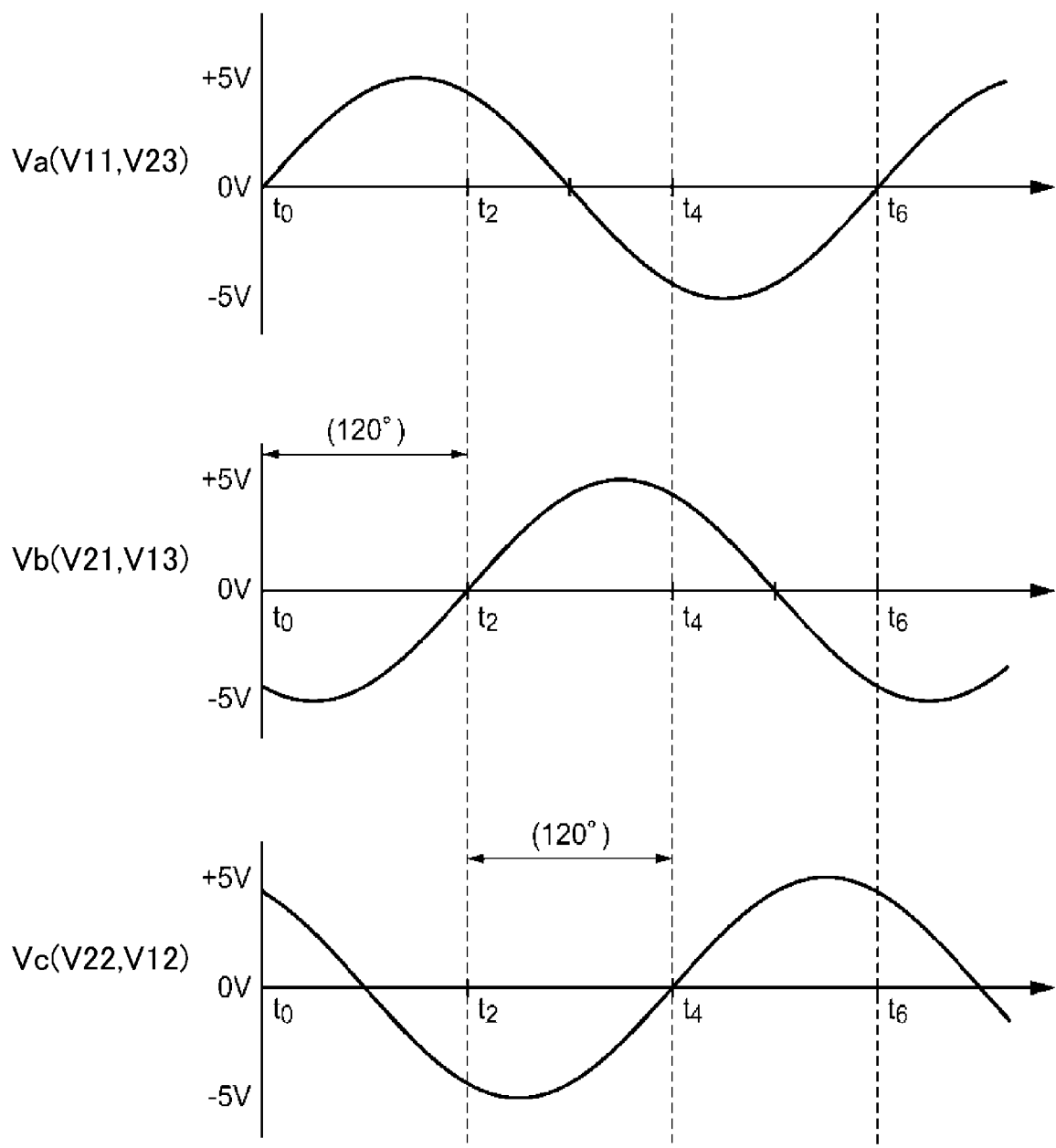
FIG. 14 is an explanatory diagram of signals used in the liquid crystal device according to Exemplary Embodiment 4 of the present disclosure.

FIG. 14 is an explanatory diagram of signals used in the liquid crystal device 100 according to Exemplary Embodiment 4 of the present disclosure, and FIG. 14 corresponds to FIG. 9 referenced in Exemplary Embodiment 1. In the first embodiment, signals applied to the ion trap electrodes (the first electrode 131, the second electrode 132, and the third electrode 133) and the dummy pixel electrodes (the first pixel electrode 151 and the second pixel electrode 152) are rectangular waves, but, as illustrated in FIG. 14, sine waves having different phases to one another may be utilized in a time period of one cycle.

Note that in both the rectangular wave and the sine wave, the maximum potential of the positive polarity and the maximum potential of the negative polarity need not necessarily be the same with respect to the reference potential. For example, an AC signal that has 0V as the reference potential and that oscillates between 5V and −5V, an AC signal that has 0V as the reference potential and that oscillates between 7.5V and −7.5V, and an AC signal that has 0V as the reference potential and that oscillates between 10V and −10V may be used.

Exemplary Embodiment 5

Figure 15:
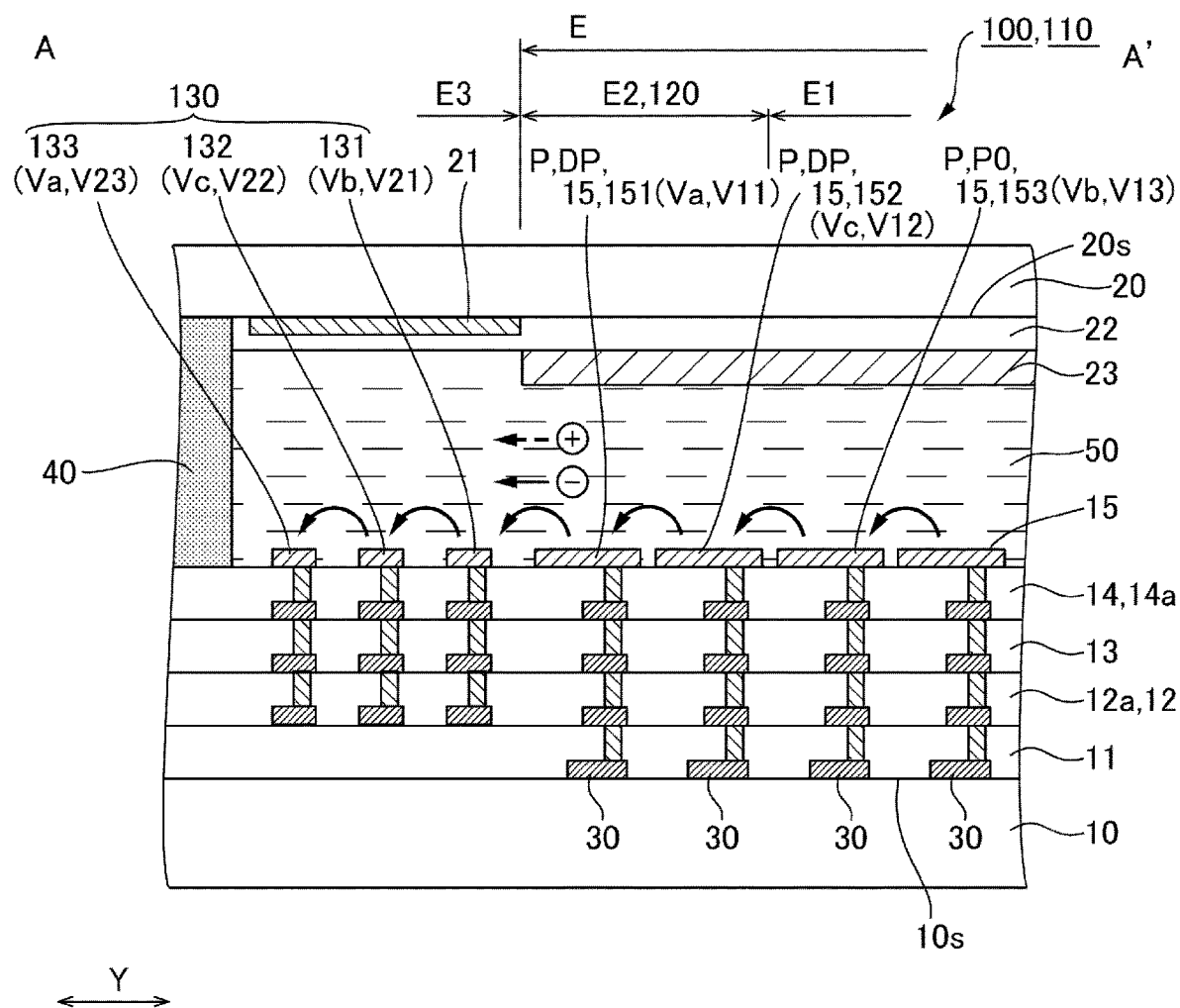
FIG. 15 is an explanatory diagram of the liquid crystal device according to Exemplary Embodiment 5 of the present disclosure.

FIG. 15 is an explanatory diagram of the liquid crystal device 100 according to Exemplary Embodiment 5 of the present disclosure, and is a cross-sectional view schematically illustrating a state in which the liquid crystal panel 110 is cut. Accordingly, FIG. 15 corresponds to FIG. 7 referenced in Exemplary Embodiment 1. Note that the basic configuration of this exemplary embodiment and exemplary embodiments to be described later is the same as the configuration of Exemplary Embodiment 1, and thus the same reference symbols are assigned to common portions and a description of the common portions will be omitted.

As illustrated in FIG. 15, in the present exemplary embodiment, the common electrode 23 provided on the second substrate 20 is provided covering an entire region overlapping with the pixel region E in a plan view, and the outer edge of the common electrode 23 is positioned between the pixel region E and the first electrode 131 in a plan view. Therefore, there is almost no common electrode 23 in a portion overlapping in a plan view with the ion trap electrodes (the first electrode 131, the second electrode 132, and the third electrode 133). Therefore, the electric field is not easily generated between the ion trap electrodes (the first electrode 131, the second electrode 132, and the third electrode 133) and the common electrode 23, and the ionic impurities can be efficiently swept out to a demarcation region E3 on the outside of the pixel region E by the scrolling of the electric field generated between the first electrode 131, the second electrode 132, and the third electrode 133.

In this case, although not illustrated, for example, if a configuration is adopted in which a draw-out wiring line extending from a portion of the outer edge of the common electrode 23 is provided, and the common electrode 23 is electrically coupled to the vertical conduction portion 106 via the draw-out wiring line, an area over which the ion trap electrodes (the first electrode 131, the second electrode 132, and the third electrode 133) overlap with the common electrode 23 in a plan view can be largely reduced.

In addition, a partial cut-out portion may be provided in the first electrode 131, the second electrode 132, and the third electrode 133, and the draw-out wiring line may be caused to extend in a portion overlapping with the cut-out portion in a plan view. Further, an insulating film of an appropriate thickness may be provided on an upper layer of a portion of the common electrode 23 that is formed in the region where the first electrode 131, the second electrode 132, and the third electrode 133 are provided, as an aspect in which the electric field is not easily generated between the ion trap electrodes (the first electrode 131, the second electrode 132, and the third electrode 133) and the common electrode 23.

Exemplary Embodiment 6

Figure 16:
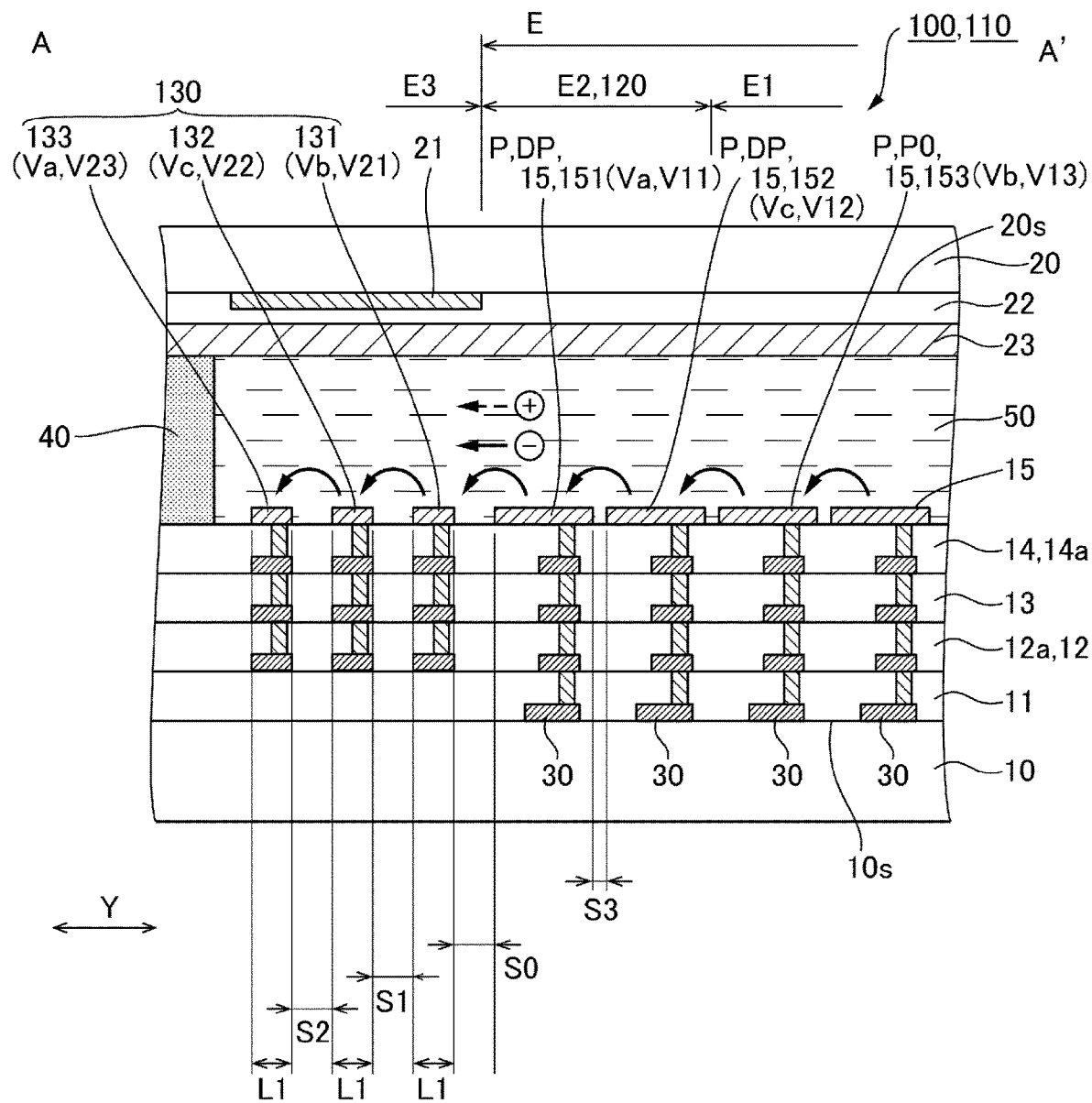
FIG. 16 is an explanatory diagram of the liquid crystal device according to Exemplary Embodiment 6 of the present disclosure.
Figure 17:
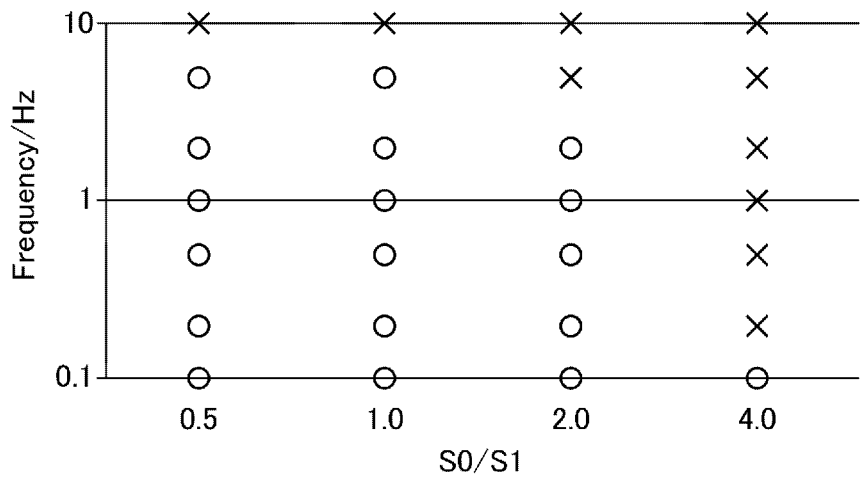
FIG. 17 is an explanatory diagram illustrating a relationship between a configuration of ion trap electrodes illustrated in FIG. 16 and an effect of sweeping the ionic impurities.

FIG. 16 is an explanatory diagram of the liquid crystal device 100 according to Exemplary Embodiment 6 of the present disclosure, and is a cross-sectional view schematically illustrating a state in which the liquid crystal panel 110 is cut. Accordingly, FIG. 16 corresponds to FIG. 7 referenced in Exemplary Embodiment 1. FIG. 17 is an explanatory diagram illustrating a relationship between the configuration of the ion trap electrodes illustrated in FIG. 16 and an effect of the sweeping of the ionic impurities, and FIG. 17 illustrates a ratio of a distance between the electrodes, and the effect of the sweeping of the ionic impurities when the frequency of the signal is changed. More specifically, FIG. 17 illustrates the results of evaluating the effect of the sweeping of the ionic impurities with an electrophoretic simulator when a value obtained by dividing an interval S0 between the first electrode 131 and the pixel electrode 15 by an interval S1 between the first electrode 131 and the second electrode 132 is changed from 0.5 to 4, and the frequency of the signal is changed from 0.1 Hz to 10 Hz. In FIG. 16, conditions in which a sufficient sweeping effect is obtained with respect to the ionic impurities are indicated by white circle (○), and conditions in which an insufficient sweeping effect with respect to the ionic impurities is obtained are indicated by cross mark (x). Here, the arrangement pitch of the ion trap electrodes (the first electrode 131, the second electrode 132, and the third electrode 133) is 4 µm, and the width of each of the ion trap electrodes and the interval between the ion trap electrodes are both 2 µm.

As illustrated in FIG. 16, in the present exemplary embodiment, the first electrode 131, the second electrode 132, and the third electrode 133 are arranged at equal intervals in the Y direction. A width L1 of the first electrode 131, the second electrode 132, and the third electrode 133 in the Y direction is 4 µm, for example, and the pitch in the Y direction in a plan view of the first electrode 131, the second electrode 132, and the third electrode 133 is 8 µm, for example. Accordingly, both the interval S1 (a second interval) between the first electrode 131 and the second electrode 132 in the Y direction in a plan view, and an interval S2 (a third interval) between the second electrode 132 and the third electrode 133 in the Y direction in a plan view are 4 µm.

Further, as illustrated in FIG. 17, when the signal frequency is changed from 0.1 Hz to 10 Hz, and the value obtained by dividing the interval S0 (a first interval) between the first electrode 131 and the pixel electrode 15 by the interval S1 between the first electrode 131 and the second electrode 132 (that is equal to the interval S2 between the second electrode 132 and the third electrode 133) is changed from 0.5 to 4, the smaller the ratio S0/S1, the higher an upper limit of the frequency at which the sufficient sweeping effect can be obtained. For example, if the ratio S0/S1 is between 0.5 to 1.0, the sufficient sweeping effect can be obtained with a signal frequency of 0.1 Hz to 5 Hz, whereas if the ratio S0/S1 is 2.0, the sufficient sweeping effect can only be obtained with a signal frequency of 0.1 Hz to 2 Hz, and if the ratio S0/S1 is 4.0, the sufficient sweeping effect can only be obtained with a signal frequency of 0.1 Hz. Therefore, if the ratio S0/S1 is 1 or less, the sufficient sweeping effect can be obtained even at a relatively high frequency.

Thus, in the present exemplary embodiment, as illustrated in FIG. 16, the interval S0 in the Y direction in a plan view between the first electrode 131 and the pixel electrode 15 (the first pixel electrode 151) adjacent to the first electrode 131 in the Y direction, of the plurality of pixel electrodes 15, is set to be equal to or less than the interval S1 in the Y direction in a plan view between the first electrode 131 and the second electrode 132 (that is equal to the interval S2 in the Y direction in a plan view between the second electrode 132 and the third electrode 133). In the present exemplary embodiment, the interval S0 in the Y direction in a plan view between the pixel electrode 15 and the first electrode 131 is equal to the interval S1 in the Y direction in a plan view between the first electrode 131 and the second electrode 132 (that is equal to the interval S2 in the Y direction in a plan view between the second electrode 132 and the third electrode 133). Here, the interval is equal means that design values are equal, and the interval is defined as being equal even if there is a difference of ±10%, taking variations within a process into account. Furthermore, the interval S0 in the Y direction in a plan view between the pixel electrode 15 and the first electrode 131 is wider than an interval S3 between the pixel electrodes 15 adjacent to each other in the Y direction.

For example, the interval S0 (the first interval) between the first electrode 131 and the pixel electrode 15 is 1 µm, and the interval S1 between the first electrode 131 and the second electrode 132 and the interval S2 between the second electrode 132 and the third electrode 133 are also 1 µm. The interval between the adjacent pixel electrodes 15 is 0.5 µm.

According to this aspect, even the ionic impurities having low mobility are drawn from the pixel region E to the first electrode 131. Therefore, the ionic impurities can be appropriately swept out from the pixel region E, and the ionic impurities are therefore less likely to cause the display quality to deteriorate.

Exemplary Embodiment 7

Figure 18:
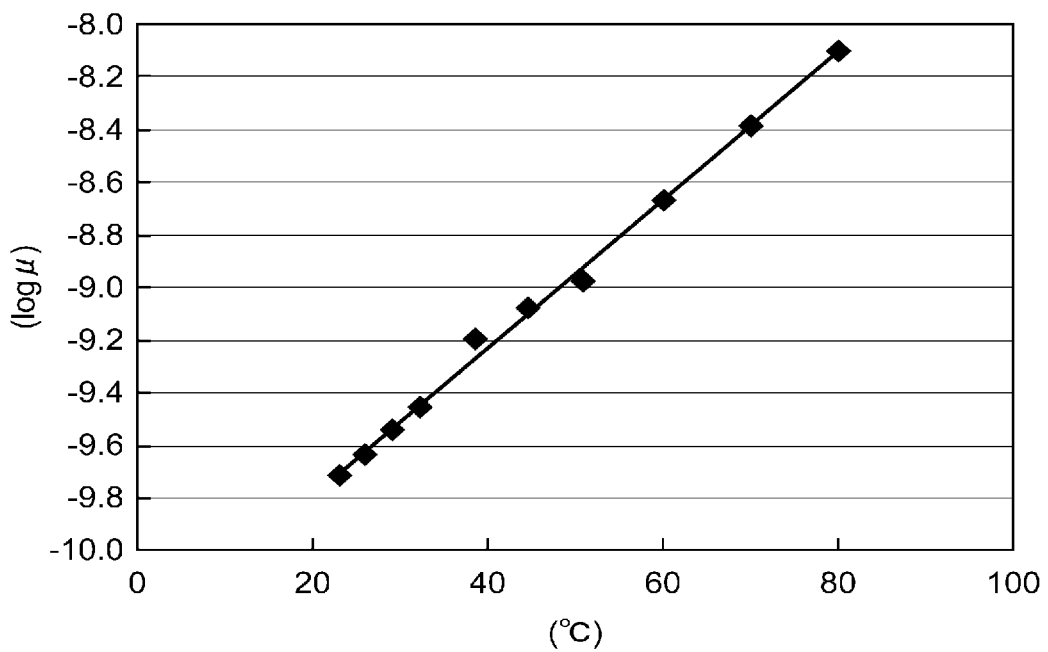
FIG. 18 is a graph illustrating a relationship between mobility and temperature of the ionic impurities.

FIG. 18 is a graph illustrating the relationship between mobility p and the temperature of the ionic impurities. In the graph illustrated in FIG. 18, the horizontal axis is the temperature of the ionic impurities and the temperature increases as it goes to the right. The vertical axis is the mobility of the ionic impurities and is indicated by a log p value. As can be seen from FIG. 18, the mobility µ (a movement velocity v) of the ionic impurities is dependent on the temperature, and the logarithm of the mobility µ (that is, log µ) can be determined by the following equation. Note that T is a temperature ° C.

$$\log \mu = 0.0282\ T - 10.357$$

Therefore, if the temperature at which the liquid crystal device 100 is actually driven is higher than room temperature, the ionic impurities can be properly swept even when the frequency (10 mHz to 50 mHz) of the signal is increased. For example, the value of the mobility µ of the ionic impurities when the temperature is at room temperature (25° C., for example) is approximately −9.6 as a value of log p. In contrast, the value of the mobility µ of the ionic impurities when the temperature is 60° C. is −8.7 as a value of log p. That is, the mobility µ of the ionic impurities at 60° C. is approximately 10 times greater than at 25° C. Here, the temperature of 60° C. is focused on because the temperature when the liquid crystal device 100 is used as the light valve of the projection-type display device is considered. Thus, when the temperature of the projection-type display device increases, the mobility of the ionic impurities also increases. Specifically, although an AC signal of 50 mHz is applied at room temperature, the sweeping can be performed, for example, even by applying an AC signal of 500 mHz. That is, the frequency of the AC signal can be increased, and the ionic impurities can be efficiently swept. Further, a risk of the image sticking can be reduced.

Thus, for example, an aspect may be adopted in which a temperature sensor configured to measure the temperature of the liquid crystal device 100 is provided, and a controller appropriately sets the frequency of the signals for sweeping the ionic impurities based on information obtained by the temperature sensor.

Exemplary Embodiment 8

Figure 19:
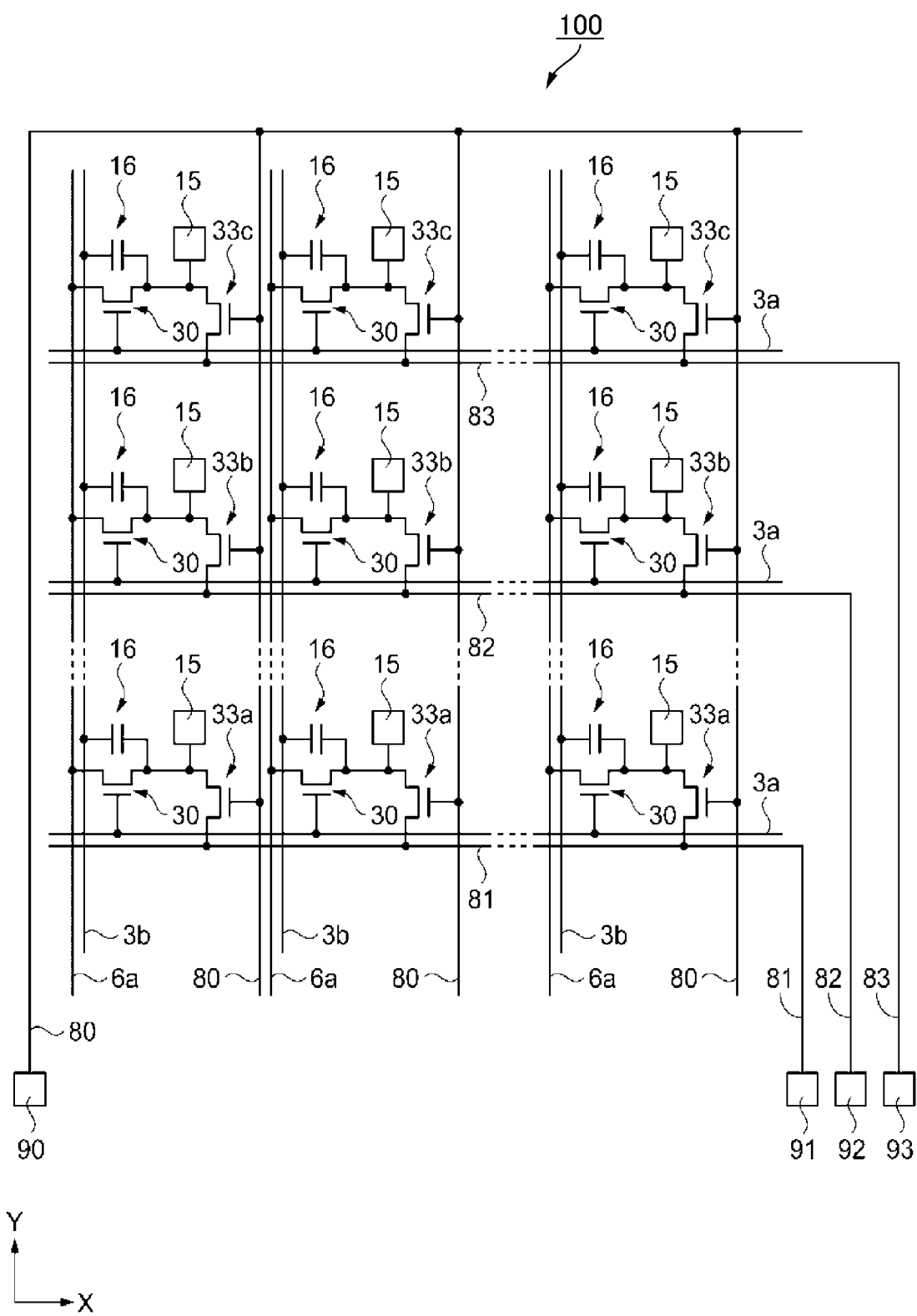
FIG. 19 is an equivalent circuit diagram illustrating an electrical configuration of the liquid crystal device according to Exemplary Embodiment 8 of the present disclosure.

FIG. 19 is an equivalent circuit diagram illustrating an electrical configuration of the liquid crystal device 100 according to Exemplary Embodiment 8 of the present disclosure. Accordingly, FIG. 19 corresponds to FIG. 3 referenced in Exemplary Embodiment 1. As illustrated in FIG. 19, the liquid crystal device 100 of the present exemplary embodiment includes a plurality of selection wiring lines 80, a plurality of writing wiring lines (a first writing wiring line 81, a second writing wiring line 82, and a third writing wiring line 83) insulated and orthogonal to the selection wiring lines 80 in at least the pixel region E, and a switching element 33. Selection wiring lines 80 are electrically coupled to gates of TFTs 33a, 33b, and 33c used as the switching elements 33. The selection wiring lines 80 are electrically coupled to a selection terminal 90. By applying a voltage to the selection terminal 90, all the TFTs 33a, 33b, and 33c coupled to the plurality of selection wiring lines 80 can be selected.

The plurality of writing wiring lines (the first writing wiring line 81, the second writing wiring line 82, and the third writing wiring line 83) are each electrically coupled to the pixel electrodes 15 via the TFTs 33a, 33b, and 33c. Accordingly, when the ionic impurities are swept, signals can be supplied to the pixel electrodes 15 via the TFTs 33a, 33b, and 33c from the plurality of writing wiring lines (the first writing wiring line 81, the second writing wiring line 82, and the third writing wiring line 83).

Exemplary Embodiment 9

Figure 20:
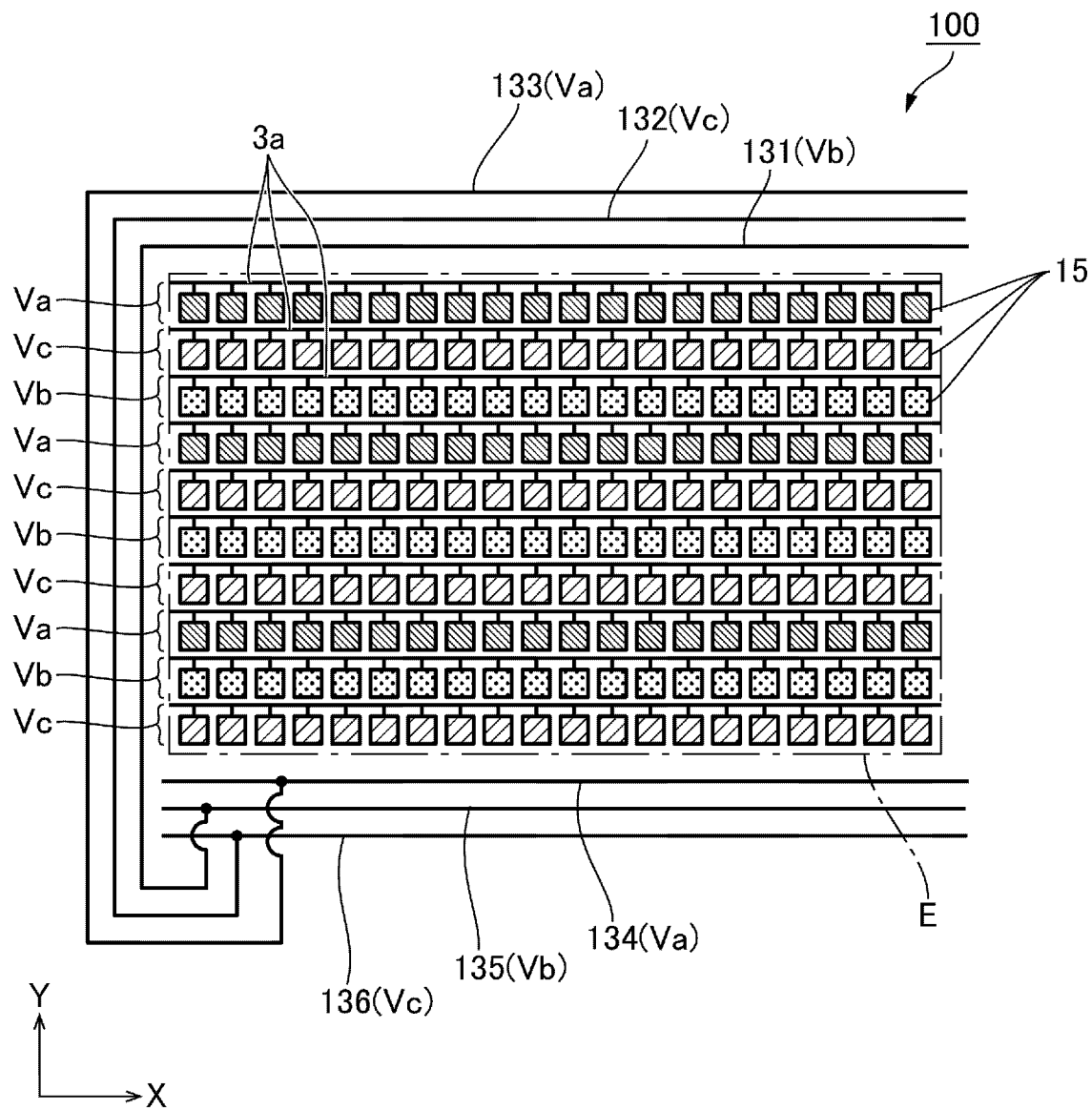
FIG. 20 is an explanatory diagram of the liquid crystal device according to Exemplary Embodiment 9 of the present disclosure.

FIG. 20 is an explanatory diagram of the liquid crystal device 100 according to Exemplary Embodiment 9 of the present disclosure, and is an explanatory diagram illustrating the operation of sweeping the ionic impurities in the pixel region E to the end portions of the pixel region E. Accordingly, FIG. 20 corresponds to FIG. 8 referenced in Exemplary Embodiment 1.

In Exemplary Embodiment 1, the combination of electrodes located on both sides in the Y direction and the applied signals are symmetrical, but, if an aspect is adopted in which the signals having the delayed phases are supplied from the electrodes positioned on the inside of the pixel region E to the electrodes arranged toward the sealing member 40, as illustrated in FIG. 20, the combination of electrodes located on both sides in the Y direction and the applied signals may be asymmetrical. For example, when the signal of the first phase Va is supplied to the pixel electrode 15 located at the end on a first side in the Y direction of the pixel region E, and the signal of the third phase Vc is supplied to the pixel electrode 15 located at the end on a second side in the Y direction of the pixel region E, the order of the signals applied to the ion trap electrodes (the electrode 134, 135, and 136) arranged on the second side in the Y direction of the pixel region E may be different to that of the first side in the Y direction.

Other Exemplary Embodiments

In the exemplary embodiments described above, the phase of each signal is shifted by 120°, but the amount of the phase shift may be a value other than 120°. However, from the perspective of simplifying the configuration of the circuit that produces the signals, it is preferable that a value obtained by dividing 360° by the amount of the phase shift be an integer.

In the exemplary embodiments described above, although the present disclosure is applied to the transmissive type liquid crystal device 100, the present disclosure may also be applied to a reflective type liquid crystal device.

In the exemplary embodiments described above, the ion trap electrodes (the first electrode 131, the second electrode 132, and the third electrode 133) are provided on the first substrate 10, but an aspect may be adopted in which the ion trap electrodes (the first electrode 131, the second electrode 132, and the third electrode 133) are provided on the second substrate 20.

In the exemplary embodiments described above, the common electrode 23 is provided on the second substrate 20, but the present disclosure may be applied to an in-plane switching (IPS) mode liquid crystal device in which the common electrode 23 is provided on the first substrate 10.

Configuration Example of Electronic Apparatus

Configuration Examples of Projection-type Display Device

Figure 21:
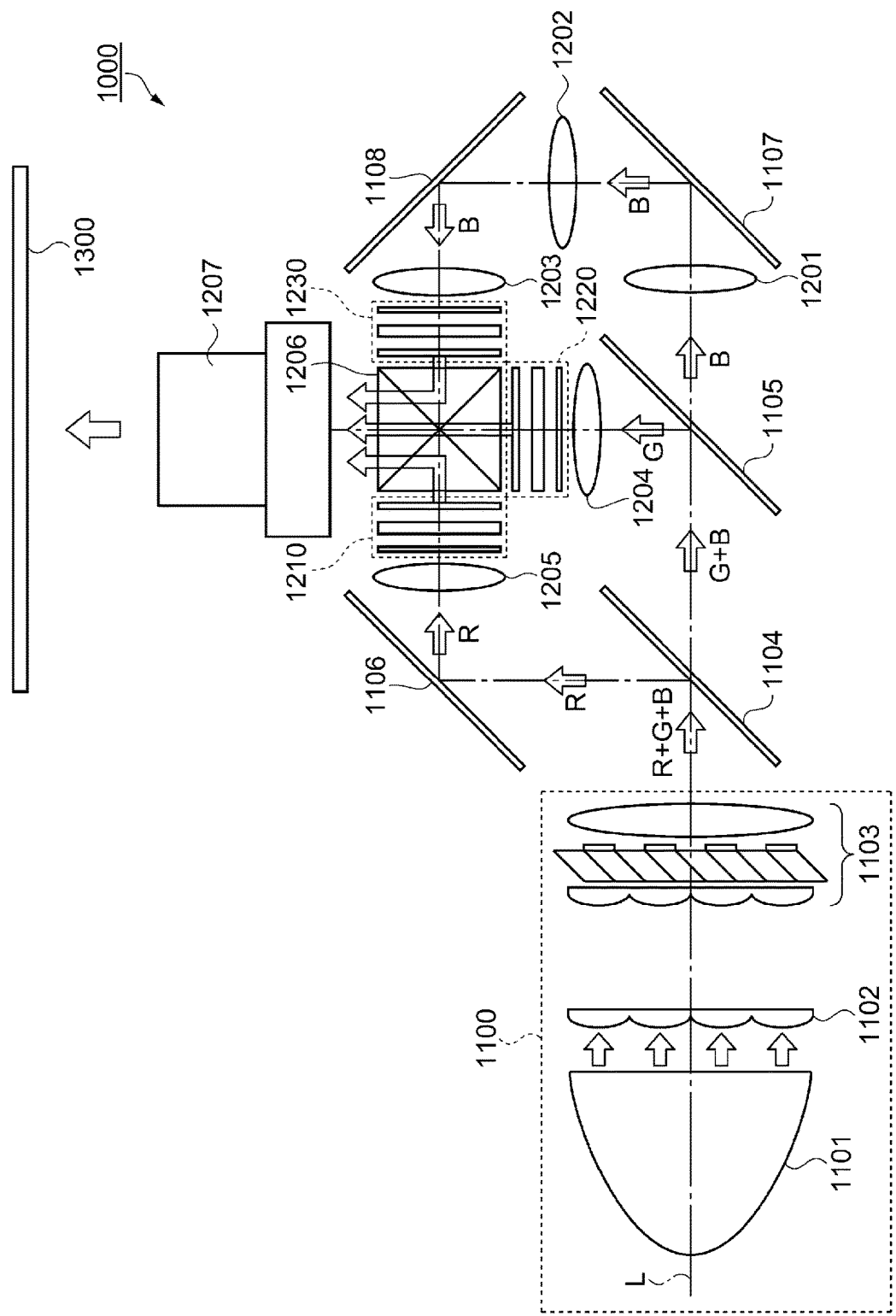
FIG. 21 is an explanatory diagram illustrating a configuration example of an electronic apparatus to which the present disclosure is applied.

FIG. 21 is an explanatory diagram illustrating a configuration example of an electronic apparatus to which the present disclosure is applied. As illustrated in FIG. 21, a projection-type display device 1000 as an electronic apparatus according to the present exemplary embodiment includes a polarized light illumination device 1100 disposed along a system optical axis L, two dichroic mirrors 1104 and 1105 as light separation elements, three reflection mirrors 1106, 1107, and 1108, five relay lenses 1201, 1202, 1203, 1204, and 1205, three transmissive liquid crystal light valves 1210, 1220, and 1230 as optical modulation units, a cross dichroic prism 1206 as a photosynthesis element, and a projection lens 1207. The polarized light illumination device 1100 is generally configured by a lamp unit 1101 as a light source formed from a white light source such as an extra-high pressure mercury lamp or a halogen lamp, an integrator lens 1102, and a polarization conversion element 1103.

The dichroic mirror 1104 reflects red light (R) of a polarized light flux emitted from the polarized light illumination device 1100 and transmits green light (G) and blue light (B). The other dichroic mirror 1105 reflects the green light (G) transmitted by the dichroic mirror 1104 and transmits the blue light (B). The red light (R) reflected by the dichroic mirror 1104 is reflected by the reflection mirror 1106 and subsequently is incident on the liquid crystal light valve 1210 via the relay lens 1205. The green light (G) reflected by the dichroic mirror 1105 is incident on the liquid crystal light valve 1220 via the relay lens 1204. The blue light (B) transmitted by the dichroic mirror 1105 is incident on the liquid crystal light valve 1230 via a light guide system formed of the three relay lenses 1201, 1202, and 1203 and the two reflection mirrors 1107 and 1108.

The liquid crystal light valves 1210, 1220, and 1230 are each disposed to face an incident surface of each type of color light of the cross dichroic prism 1206. The color light incident on the liquid crystal light valves 1210, 1220, and 1230 is modulated based on a video signal and is emitted toward the cross dichroic prism 1206. In the cross dichroic prism 1206, four right-angle prisms are bonded together, and on inner surfaces of the prisms, a dielectric multilayer film configured to reflect the red light and a dielectric multilayer film configured to reflect the blue light are formed in a cross shape. Three types of color light are synthesized by these dielectric multilayer films, and light representing a color image is synthesized. The synthesized light is projected onto a screen 1300 by the projection lens 1207 as a projection optical system, and an image is enlarged and displayed.

The liquid crystal device 100 including the ion trap mechanism 130 described above is used as the liquid crystal light valve 1210, and a pair of light-polarizing elements are disposed in a crossed-Nicol state with a gap on the incident side and the emission side of the color light of the liquid crystal panel 110. The same applies to the other liquid crystal light valves 1220 and 1230.

According to this type of the projection-type display device 1000, the liquid crystal device 100 according to Exemplary Embodiment 1 and the like is used as the liquid crystal light valves 1210, 1220, and 1230, and thus, a display defect caused by ionic impurities is improved, and the projection-type display device 1000 having an excellent display quality can be provided.

Other Exemplary Embodiments

The present disclosure is not limited to the embodiments described above, and may be modified as appropriate insofar that it does not depart from the scope of the claims and the spirit or concepts of the disclosure as inferred from the entire specification, and a driving method of the liquid crystal device according to such changes, and the electronic apparatus to which the liquid crystal device is applied are also included within the technical scope of the present disclosure. In addition, the electronic apparatus to which the liquid crystal device 100 according to the present disclosure can be applied is not limited to the projection-type display device, and may be suitably used as a display unit of a projection-type head-up display (HUD), a direct view type head-mounted display (HMD), an electronic book, a personal computer, a digital still camera, a liquid crystal television, a view finder-type or monitor direct view-type video recorder, a car navigation system, an electronic diary, an information terminal device such as POS, or the like.

What is claimed is:

1. A liquid crystal device comprising:
   a first substrate;
   a second substrate adhered to the first substrate via a sealing material;
   a liquid crystal layer disposed in a space enclosed by the sealing material between the first substrate and the second substrate;
   a plurality of pixel electrodes provided at a pixel region of the first substrate;
   a first electrode provided at one of the substrates, of the first substrate and the second substrate, and positioned, in a plan view, between the pixel region and the sealing material; and
   a second electrode provided at the one of the substrates and positioned, in a plan view, between the first electrode and the sealing material, wherein
   a first signal of a first phase is supplied to a first pixel electrode, of the plurality of pixel electrodes, adjacent to the first electrode, a second signal of a second phase having a phase delay with respect to the first signal is supplied to the first electrode, and a third signal of a third phase having a phase delay with respect to the second signal is supplied to the second electrode, and
   a fourth signal is applied to a second pixel electrode, of the plurality of pixel electrodes, adjacent to the first pixel electrode at a side opposite to the first electrode, the fourth signal having a phase being advanced with respect to the first phase.

2. The liquid crystal device according to claim 1, wherein the first signal, the second signal, and the third signal are AC signals having the same frequency,
   after the first signal transitions from a positive polarity or a reference potential to a negative polarity and before the first signal transitions to the reference potential or the positive polarity, the second signal transitions from the positive polarity or the reference potential to the negative polarity,
   after the second signal transitions to the negative polarity and before the second signal transitions to the reference potential or the positive polarity, the third signal transitions from the positive polarity or the reference potential to the negative polarity,
   after the first signal transitions from the negative polarity or the reference potential to the positive polarity and before the first signal transitions to the reference potential or the negative polarity, the second signal transitions from the negative polarity or the reference potential to the positive polarity, and
   after the second signal transitions from the negative polarity or the reference potential to the positive polarity and before the second signal transitions to the reference potential or the negative polarity, the third signal transitions from the negative polarity or the reference potential to the positive polarity.

3. The liquid crystal device according to claim 2, wherein the first signal, the second signal, and the third signal are AC signals having the same waveform.

4. The liquid crystal device according to claim 1, wherein the one of the substrates is the first substrate.

5. The liquid crystal device according to claim 4, wherein a light shielding demarcation portion overlapping, in a plan view, with the first electrode and the second electrode is provided at the second substrate.

6. The liquid crystal device according to claim 5, wherein the demarcation portion overlaps, in a plan view, with the first pixel electrode.

7. The liquid crystal device according to claim 5, wherein the demarcation portion does not overlap, in a plan view, with the first pixel electrode and
   the first pixel electrode is supplied, during a period of displaying an image, with a signal configured to perform black display.

8. The liquid crystal device according to claim 5, wherein the demarcation portion does not overlap, in a plan view, with the first pixel electrode and
   the first signal is applied to the first pixel electrode during the period of displaying the image by the plurality of pixel electrodes and also during a period of pausing display of the image.

9. The liquid crystal device according to claim 1, wherein a common electrode is provided at the second substrate.

10. The liquid crystal device according to claim 9, wherein
    the common electrode is provided at a region overlapping, in a plan view, with the pixel region and
    an outer edge of the common electrode is positioned, in a plan view, between the pixel region and the first electrode.

11. An electronic apparatus comprising the liquid crystal device according to claim 1.

12. A driving method of a liquid crystal device including a first substrate, a second substrate adhered to the first substrate via a sealing material, a liquid crystal layer disposed in a space enclosed by the sealing material between the first substrate and the second substrate, and a plurality of pixel electrodes provided at a pixel region of the first substrate,
    a first electrode being provided at one of the substrates, of the first substrate and the second substrate, and positioned, in a plan view, between the pixel region and the sealing material,
    a second electrode being provided at the one of the substrates and positioned, in a plan view, between the first electrode and the sealing material, the method comprising:
    supplying a first signal of a first phase to a first pixel electrode, of the plurality of pixel electrodes, adjacent to the first electrode;

supplying a second signal of a second phase having a phase delay with respect to the first signal to the first electrode;

supplying a third signal of a third phase having a phase delay with respect to the second signal to the second electrode; and applying a fourth signal to a second pixel electrode, of the plurality of pixel electrodes, adjacent to the first pixel electrode at a side opposite to the first electrode, the fourth signal having a phase being advanced with respect to the first phase.

13. A driving method of the liquid crystal device according to claim 12, wherein the first signal, the second signal, and the third signal are AC signals having the same frequency, after the first signal transitions from a positive polarity or a reference potential to a negative polarity and before the first signal transitions to the reference potential or the positive polarity, the second signal transitions from the positive polarity or the reference potential to the negative polarity, after the second signal transitions to the negative polarity and before the second signal transitions to the reference potential or the positive polarity, the third signal transitions from the positive polarity or the reference potential to the negative polarity, after the first signal transitions from the negative polarity or the reference potential to the positive polarity and before the first signal transitions to the reference potential or the negative polarity, the second signal transitions from the negative polarity or the reference potential to the positive polarity, and after the second signal transitions from the negative polarity or the reference potential to the positive polarity and before the second signal transitions to the reference potential or the negative polarity, the third signal transitions from the negative polarity or the reference potential to the positive polarity.

* * * * *